United States Patent
Wu et al.

(10) Patent No.: US 6,700,933 B1
(45) Date of Patent: Mar. 2, 2004

(54) SYSTEM AND METHOD WITH ADVANCE PREDICTED BIT-PLANE CODING FOR PROGRESSIVE FINE-GRANULARITY SCALABLE (PFGS) VIDEO CODING

(75) Inventors: Feng Wu, Beijing (CN); Shipeng Li, Princeton, NJ (US); Ya-Qin Zhang, West Windsor, NJ (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/505,254

(22) Filed: Feb. 15, 2000

(51) Int. Cl.[7] .......................... H04N 7/12; H04N 11/04; H04N 11/02
(52) U.S. Cl. .......................... 375/240.16; 375/240.03; 375/240.25; 375/240.27
(58) Field of Search .................. 375/240.25, 240.27, 375/240.16, 240.03

(56) References Cited

U.S. PATENT DOCUMENTS

| | | | | |
|---|---|---|---|---|
| 6,128,041 A | * | 10/2000 | Han et al. | 375/240.12 |
| 6,173,013 B1 | * | 1/2001 | Suzuki et al. | 375/240.16 |
| 6,263,022 B1 | * | 7/2001 | Chen et al. | 375/240.25 |
| 6,292,512 B1 | * | 9/2001 | Radha et al. | 375/240.1 |
| 6,363,119 B1 | * | 3/2002 | Oami | 375/240.03 |
| 6,377,309 B1 | * | 4/2002 | Ito et al. | 348/554 |
| 6,392,705 B1 | * | 5/2002 | Chaddha | 348/388.1 |
| 6,480,547 B1 | * | 11/2002 | Chen et al. | 375/240.27 |
| 6,490,705 B1 | * | 12/2002 | Boyce | 714/776 |
| 6,496,980 B1 | * | 12/2002 | Tillman et al. | 725/90 |
| 6,553,072 B1 | * | 4/2003 | Chiang et al. | 375/240.25 |
| 6,567,427 B1 | * | 5/2003 | Suzuki et al. | 370/535 |

FOREIGN PATENT DOCUMENTS

| | | |
|---|---|---|
| WO | WO 99/33274 | 7/1999 |
| WO | WO 00/05898 | 2/2000 |

OTHER PUBLICATIONS

"Coding of Moving Pictures and Audio," ISO/IEC JTC1/SC29/WG11 MPEG99/M5122, University of New South Wales, Oct. 1999.
"Coding of Moving Pictures and Associated Audio," ISO/IEC JTC1/SC29/WG11 MPEG98/M4204, Dec. 1998.
"Coding of Moving Pictures and Audio," ISO/IEC JTC1/SC29/WG11 MPEG99/M5583, Dec. 1999.

* cited by examiner

Primary Examiner—Andy Rao
Assistant Examiner—Charles Parsons
(74) Attorney, Agent, or Firm—Lee & Hayes PLLC

(57) ABSTRACT

A video encoding scheme employs progressive fine-granularity layered coding to encode video data frames into multiple layers, including a base layer of comparatively low quality video and multiple enhancement layers of increasingly higher quality video. Some of the enhancement layers in a current frame are predicted from at least one same or lower quality layer in a reference frame, whereby the lower quality layer is not necessarily the base layer. Use of multiple reference layers of different quality results in occasional fluctuations in the encoded image data. The video encoding scheme efficiently eliminates such fluctuations by predicting higher quality data from the lower quality data encoded in the base layer and a low quality enhancement layer.

29 Claims, 18 Drawing Sheets

Low Quality Predicted DCT (LQPD)
Coefficients of Base Layer

*Fig. 11*

Dequantized DCT
Coefficients for Base Layer

*Fig. 12*

Low Quality Predicted DCT (LQPD) 400

−

Encoded DCT (ECD) 420

=

Low Quality DCT Residues 430

Fig. 15

High Quality Predicted
DCT (HQPD)

*Fig. 16*

High Quality Predicted
DCT (HQPD) 440

−

ENCODED DCT
(ECD) 420

=

HIGH QUALITY
DCT RESIDUES
450

*Fig. 17*

SYSTEM AND METHOD WITH ADVANCE PREDICTED BIT-PLANE CODING FOR PROGRESSIVE FINE-GRANULARITY SCALABLE (PFGS) VIDEO CODING

TECHNICAL FIELD

This invention relates to systems and methods for coding video data, and more particularly, to motion-compensation-based video coding schemes that employ fine-granularity layered coding.

BACKGROUND

Efficient and reliable delivery of video data is becoming increasingly important as the Internet continues to grow in popularity. Video is very appealing because it offers a much richer user experience than static images and text. It is more interesting, for example, to watch a video clip of a winning touchdown or a Presidential speech than it is to read about the event in stark print. Unfortunately, video data is significantly larger than other data types commonly delivered over the Internet. As an example, one second of uncompressed video data may consume one or more Megabytes of data. Delivering such large amounts of data over error-prone networks, such as the Internet and wireless networks, presents difficult challenges in terms of both efficiency and reliability.

To promote efficient delivery, video data is typically encoded prior to delivery to reduce the amount of data actually being transferred over the network. Image quality is lost as a result of the compression, but such loss is generally tolerated as necessary to achieve acceptable transfer speeds. In some cases, the loss of quality may not even be detectable to the viewer.

Video compression is well known. One common type of video compression is a motion-compensation-based video coding scheme, which is used in such coding standards as MPEG-1, MPEG-2, MPEG-4, H.261, and H.263.

One particular type of motion-compensation-based video coding scheme is fine-granularity layered coding. Layered coding is a family of signal representation techniques in which the source information is partitioned into a sets called "layers". The layers are organized so that the lowest, or "base layer", contains the minimum information for intelligibility. The other layers, called "enhancement layers", contain additional information that incrementally improves the overall quality of the video. With layered coding, lower layers of video data are often used to predict one or more higher layers of video data.

The quality at which digital video data can be served over a network varies widely depending upon many factors, including the coding process and transmission bandwidth. "Quality of Service", or simply "QoS", is the moniker used to generally describe the various quality levels at which video can be delivered. Layered video coding schemes offer a range of QoSs that enable applications to adopt to different video qualities. For example, applications designed to handle video data sent over the Internet (e.g., multi-party video conferencing) must adapt quickly to continuously changing data rates inherent in routing data over many heterogeneous sub-networks that form the Internet. The QoS of video at each receiver must be dynamically adapted to whatever the current available bandwidth happens to be. Layered video coding is an efficient approach to this problem because it encodes a single representation of the video source to several layers that can be decoded and presented at a range of quality levels.

Apart from coding efficiency, another concern for layered coding techniques is reliability. In layered coding schemes, a hierarchical dependence exists for each of the layers. A higher layer can typically be decoded only when all of the data for lower layers or the same layer in the previous prediction frame is present. If information at a layer is missing, any data for the same or higher layers is useless. In network applications, this dependency makes the layered encoding schemes very intolerant of packet loss, especially at the lower layers. If the loss rate is high in layered streams, the video quality at the receiver is very poor.

FIG. 1 depicts a conventional layered coding scheme 20, known as "fine-granularity scalable" or "FGS". Three frames are shown, including a first or intraframe 22 followed by two predicted frames 24 and 26 that are predicted from the intraframe 22. The frames are encoded into four layers: a base layer 28, a first layer 30, a second layer 32, and a third layer 34. The base layer typically contains the video data that, when played, is minimally acceptable to a viewer. Each additional layer contains incrementally more components of the video data to enhance the base layer. The quality of video thereby improves with each additional layer. This technique is described in more detail in an article by Weiping Li, entitled "Fine Granularity Scalability Using Bit-Plane Coding of DCT Coefficients", ISO/IEC JTC1/SC29/WG11, MPEG98/M4204 (December 1998).

With layered coding, the various layers can be sent over the network as separate sub-streams, where the quality level of the video increases as each sub-stream is received and decoded. The base-layer video 28 is transmitted in a well-controlled channel to minimize error or packet-loss. In other words, the base layer is encoded to fit in the minimum channel bandwidth. The goal is to deliver and decode at least the base layer 28 to provide minimal quality video. The enhancement 30–34 layers are delivered and decoded as network conditions allow to improve the video quality (e.g., display size, resolution, frame rate, etc.). In addition, a decoder can be configured to choose and decode a particular portion or subset of these layers to get a particular quality according to its preference and capability.

One characteristic of the illustrated FGS coding scheme is that the enhancement layers 30–34 are predictively coded from the base layer 28 in the reference frames. As shown in FIG. 1, each of the enhancement layers 30–34 in the predicted frames 24 and 26 can be predicted from the base layer of the preceding frame. In this example, the enhancement layers of predicted frame 24 can be predicted from the base layer of intraframe 22. Similarly, the enhancement layers of predicted frame 26 can be predicted from the base layer of preceding predicted frame 24.

The FGS coding scheme provides good reliability in terms of error recovery from occasional data loss. By predicting all enhancement layers from the base layer, loss or corruption of one or more enhancement layers during transmission can be remedied by reconstructing the enhancement layers from the base layer. For instance, suppose that frame 24 experiences some error during transmission. In this case, the base layer 28 of preceding intraframe 22 can be used to predict the base layer and enhancement layers of frame 24.

Unfortunately, the FGS coding scheme has a significant drawback in that the scheme is very inefficient from a coding or compression standpoint since the prediction is always based on the lowest quality base layer. Accordingly, there remains a need for a layered coding scheme that is efficient without sacrificing error recovery.

FIG. 2 depicts another conventional layered coding scheme 40 in which three frames are encoded using a technique introduced in an article by James Macnicol, Michael Frater and John Arnold, which is entitled, "Results on Fine Granularity Scalability", ISO/IEC JTC1/SC29/ WG11, MPEG99/m5122 (October 1999). The three frames include a first frame 42, followed by two predicted frames 44 and 46 that are predicted from the first frame 42. The frames are encoded into four layers: a base layer 48, a first layer 50, a second layer 52, and a third layer 54. In this scheme, each layer in a frame is predicted from the same layer of the previous frame. For instance, the enhancement layers of predicted frame 44 can be predicted from the corresponding layer of previous frame 42. Similarly, the enhancement layers of predicted frame 46 can be predicted from the corresponding layer of previous frame 44.

The coding scheme illustrated in FIG. 2 has the advantage of being very efficient from a coding perspective. However, it suffers from a serious drawback in that it cannot easily recover from data loss. Once there is an error or packet loss in the enhancement layers, it propagates to the end of a GOP (group of predicted frames) and causes serious drifting in higher layers in the prediction frames that follow. Even though there is sufficient bandwidth available later on, the decoder is not able to recover to the highest quality until an other GOP start.

Accordingly, there remains a need for an efficient layered video coding scheme that adapts to bandwidth fluctuation and also exhibits good error recovery characteristics.

SUMMARY

A video encoding scheme employs progressive fine-granularity scalable (PFGS) layered coding to encode video data frames into multiple layers, including a base layer of comparatively low quality video and multiple enhancement layers of increasingly higher quality video. Some of the enhancement layers in a current frame are predicted from at least one same or lower quality layer in a reference frame, whereby the lower quality layer is not necessarily the base layer.

In one described implementation, a video encoder encodes frames of video data into multiple layers, including a base layer and multiple enhancement layers. The base layer contains minimum quality video data and the enhancement layers contain increasingly higher quality video data. Layers in a prediction frame are predicted from both the base layer and one or more enhancement layers.

Residues resulting from the image frame prediction are defined as the difference between the original image and predicted image. When using a linear transform, such as Discrete Cosine Transform (DCT), the coefficients of the predicted residues equal the differences between the DCT coefficients of the original image and the DCT coefficients of the predicted image. Since the PFGS coding scheme uses multiple reference layers for the prediction, the coding scheme produces multiple sets of predicted DCT coefficients. The predicted DCT coefficients range in quality depending upon what reference layer is used for the prediction. Lower quality predicted DCT coefficients (or "LQPD") are produced by using lower quality reference layers, such as the base layer. Higher quality predicted DCT coefficients (or "HQPD") are produced by using higher quality enhancement layers as reference.

The expectation is that the HQPD coefficients will produce lower DCT residues in comparison to the LQPD coefficients because the reference layer is of higher quality and hence closer to the original image. Lower DCT residues translate into fewer coding layers, thereby resulting in better coding efficiency. While the expectation is valid from a mean value perspective, the various qualities of DCT residues tend to fluctuate due to the motion between frames and other reasons. In some instances, individual DCT residues in the HQPD coefficients actually increase in comparison to DCT residues produced by referencing a lower quality layer (i.e., residues in the LQPD coefficients). The undesired fluctuations and increases result in less efficient coding.

Ideally, to eliminate the fluctuations in the DCT coefficients caused by using multiple prediction references of different quality, the HQPD coefficients should be part of or partial encoded into the base layer and low enhancement layers. However, in practice, only the lower quality LQPD coefficients are encoded in the base layer and low enhancement layers.

The video encoding scheme described herein efficiently eliminates these fluctuations by predicting HQPD coefficients from the LQPD coefficients encoded in the base layer and low quality enhancement layer. These predicted HQPD coefficients, or high quality residues derived therefrom, can be calculated both in encoder and in decoder. Except for any residues from the HQPD prediction that still exceed the maximum, the bitstream containing the base layer and low quality enhancement layer need not be modified. The use of predicted HQPD coefficients improves coding efficiencies by eliminating large fluctuations prior to encoding.

BRIEF DESCRIPTION OF THE DRAWINGS

The same numbers are used throughout the drawings to reference like elements and features.

FIG. 11 is a diagrammatic illustration of an exemplary original low quality predicted DCT coefficients to be encoded.

FIG. 12 is a diagrammatic illustration of the FIG. 11 layer following quantization.

FIG. 15 is a diagrammatic illustration of a set of residues resulting from the difference between the coefficients of the FIG. 11 layer and the FIG. 14 layer.

FIG. 16 is a diagrammatic illustration of a layer that is predicted from a high quality image layer, such as an enhancement layer.

FIG. 17 is a diagrammatic illustration of a set of residues resulting from the difference between the coefficients of the FIG. 16 layer and the FIG. 14 layer.

DETAILED DESCRIPTION

This disclosure describes a layered video coding scheme used in motion-compensation-based video coding systems and methods. The coding scheme is described in the context of delivering video data over a network, such as the Internet or a wireless network. However, the layered video coding scheme has general applicability to a wide variety of environments.

Exemplary System Architecture

Figure 3:
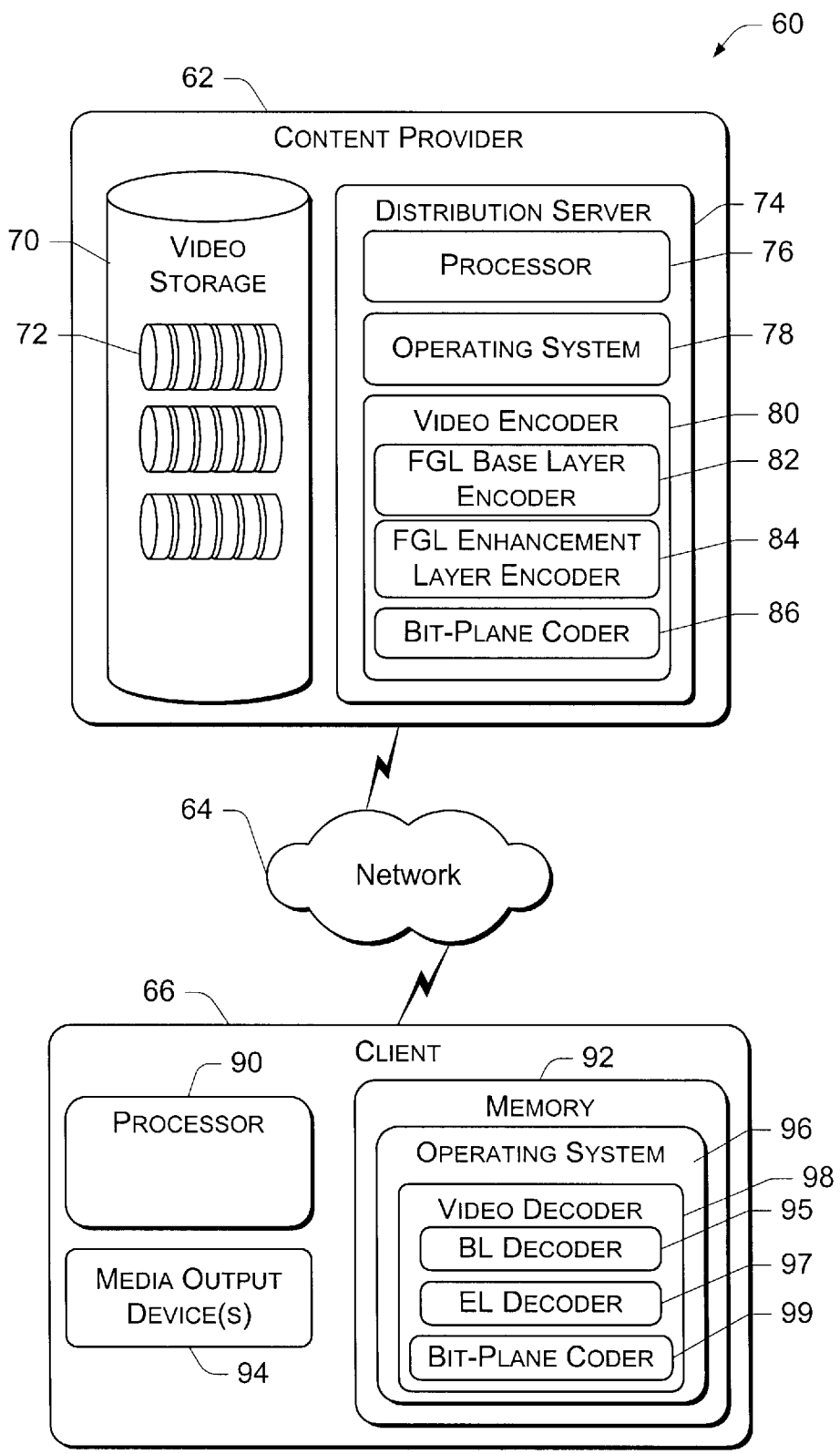
FIG. 3 is a block diagram of a video distribution system in which a content producer/provider encodes video data and transfers the encoded video data over a network to a client.

FIG. 3 shows a video distribution system 60 in which a content producer/provider 62 produces and/or distributes video over a network 64 to a client 66. The network is representative of many different types of networks, including the Internet, a LAN (local area network), a WAN (wide area network), a SAN (storage area network), and wireless networks (e.g., satellite, cellular, RF, etc.).

The content producer/provider 62 may be implemented in many ways, including as one or more server computers configured to store, process, and distribute video data. The content producer/provider 62 has a video storage 70 to store digital video files 72 and a distribution server 74 to encode the video data and distribute it over the network 64. The server 74 has a processor 76, an operating system 78 (e.g., Windows NT, Unix, etc.), and a video encoder 80. The video encoder 80 may be implemented in software, firmware, and/or hardware. The encoder is shown as a separate standalone module for discussion purposes, but may be constructed as part of the processor 76 or incorporated into operating system 78 or other applications (not shown).

The video encoder 80 encodes the video data 72 using a motion-compensation-based coding scheme. More specifically, the encoder 80 employs a progressive fine-granularity scalable (PFGS) layered coding scheme. The video encoder 80 encodes the video into multiple layers, including a base layer and one or more enhancement layers. "Fine-granularity" coding means that the difference between any two layers, even if small, can be used by the decoder to improve the image quality. Fine-granularity layered video coding makes sure that the prediction of a next video frame from a lower layer of the current video frame is good enough to keep the efficiency of the overall video coding.

The video encoder 80 has a base layer encoding component 82 to encode the video data into the base layer and an enhancement layer encoding component 84 to encode the video data into one or more enhancement layers. The video encoder encodes the video data such that some of the enhancement layers in a current frame are predicted from at least one same or lower quality layer in a reference frame, whereby the lower quality layer is not necessarily the base layer. The video encoder 80 may also include a bit-plane coding component 86 that predicts data in higher enhancement layers. Various implementations of the video encoder 80 are described below in more detail with reference to FIGS. 9, 19, and 21.

The client 66 is equipped with a processor 90, a memory 92, and one or more media output devices 94. The memory 92 stores an operating system 96 (e.g., a Windows-brand operating system) that executes on the processor 90. The operating system 96 implements a client-side video decoder 98 to decode the layered video streams into the original video. In the event data is lost, the decoder 98 is capable of reconstructing the missing portions of the video from frames that are successfully transferred. The client-side video decoder 98 has a base layer decoding component 95, an enhancement layer decoding component 97, and optionally a bit-plane coding component 99. Various implementations of the video encoder 80 are described below in more detail with reference to FIGS. 20, and 22.

Following decoding, the client stores the video in memory and/or plays the video via the media output devices 94. The client 26 may be embodied in many different ways, including a computer, a handheld entertainment device, a set-top box, a television, an Application Specific Integrated Circuits (ASIC) and so forth.

Exemplary PFGS Layered Coding Scheme

As noted above, the video encoder 80 encodes the video data into multiple layers, such that some of the enhancement layers in a current frame are predicted from at least one same or lower quality layer in a reference frame that is not necessarily the base layer. There are many ways to implement this FPGS layered coding scheme. One example is illustrated in FIG. 4 for discussion purposes and to point out the advantages of the scheme.

Figure 4:
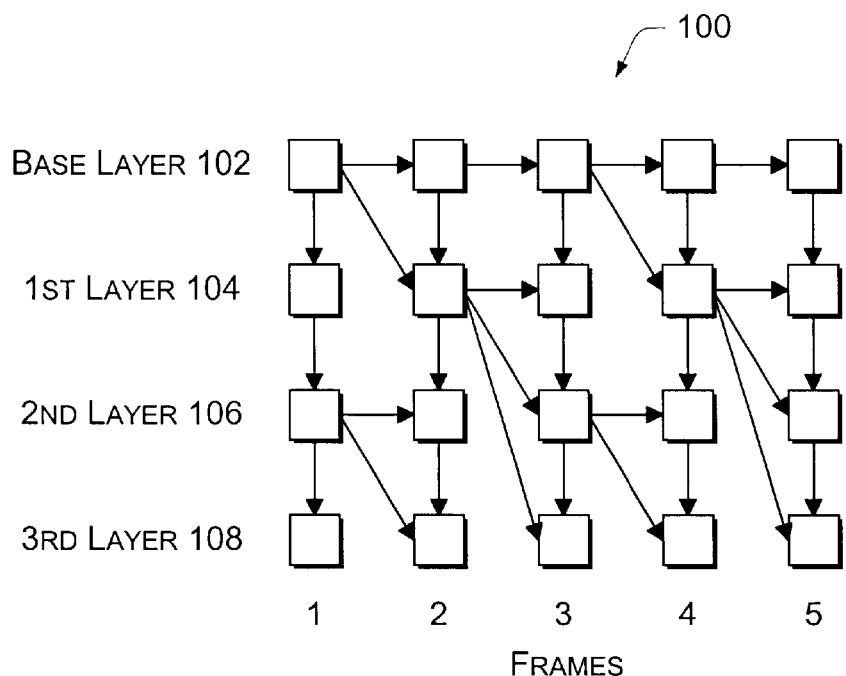
FIG. 4 is diagrammatic illustration of a layered coding scheme used by the content producer/provider to encode the video data.

FIG. 4 conceptually illustrates a PFGS layered coding scheme 100 implemented by the video encoder 80 of FIG. 3. The encoder 80 encodes frames of video data into multiple layers, including a base layer and multiple enhancement layers. For discussion purposes, FIG. 4 illustrates four layers: a base layer 102, a first layer 104, a second layer 106, and a third layer 108. The upper three layers 104–108 are enhancement layers to the base video layer 102. The term layer here refers to a spatial layer or SNR (quality layer) or both. Five consecutive frames are illustrated for discussion purposes.

For every inter frame, the original image is compensated by referencing a previous base layer and one enhancement layer to form the predicted image. Residues resulting from the prediction are defined as the difference between the original image and the predicted image. As an example, one linear transformation used to transform the original image is a Discrete Cosine Transform (DCT). Due to its linearity, the DCT coefficients of predicted residues equal the differences between DCT coefficients of the original image and the DCT coefficients of predicted image.

The number of layers produced by the PFGS layered coding scheme is not fixed, but instead is based on the number of layers needed to encode the residues. For instance, assume that a maximum residue can be represented in binary format by five bits. In this case, five enhancement layers are used to encode such residues, a first layer to code the most significant bit, a second layer to code the next most significant bit, and so on.

With coding scheme 100, higher quality layers are predicted from at least one same or lower quality layer, but not necessarily the base layer. In the illustrated example, except for the base-layer coding, the prediction of some enhancement layers in a prediction frame (P-frame) is based on a next lower layer of a reconstructed reference frame. Here, the even frames are predicted from the even layers of the preceding frame and the odd frames are predicted from the odd layers of the preceding frame. For instance, even frame 2 is predicted from the even layers of preceding frame 1 (i.e., base layer 102 and second layer 106). The layers of odd frame 3 are predicted from the odd layers of preceding frame 2 (i.e., the first layer 104 and the third layer 106). The layers of even frame 4 are once again predicted from the even layers of preceding frame 3. This alternating pattern continues throughout encoding of the video bitstream. In addition, the correlation between a lower layer and a next higher layer within the same frame can also be exploited to gain more coding efficiency.

The scheme illustrated in FIG. 4 is but one of many different coding schemes. It exemplifies a special case in a class of coding schemes that is generally represented by the following relationship:

$$L \bmod N = i \bmod M$$

where L designates the layer, N denotes a layer group depth, i designates the frame, and M denotes a frame group depth. Layer group depth defines how many layers may refer back to a common reference layer. Frame group depth refers to the number of frames or period that are grouped together for prediction purposes.

The relationship is used conditionally for changing reference layers in the coding scheme. If the equation is true, the layer is coded based on a lower reference layer in the preceding reconstructed frame.

The relationship for the coding scheme in FIG. 4 is a special case when both the layer and frame group depths are two. Thus, the relationship can be modified to L mod N=i mod N, because N=M. In this case where N=M=2, when frame i is 2 and layer L is 1 (i.e., first layer 104), the value L mod N does not equal that of i mod N, so the next lower reference layer (i.e., base layer 102) of the reconstructed reference frame 1 is used. When frame i is 2 and layer L is 2 (i.e., second layer 106), the value L mod N equals that of i mod N, so a higher layer (i.e., second enhancement layer 106) of the reference frame is used.

Generally speaking, for the case where N=M=2, this relationship holds that for even frames 2 and 4, the even layers (i.e., base layer 102 and second layer 106) of preceding frames 1 and 3, respectively, are used as reference; whereas, for odd frames 3 and 5, the odd layers (i.e., first layer 104 and third layer 108) of preceding frames 2 and 4, respectively, are used as reference.

The above coding description is yet a special case of a more general case where in each frame the prediction layer used can be randomly assigned as long as a prediction path from lower layer to higher layer is maintained across several frames.

The coding scheme affords high coding efficiency along with good error recovery. The proposed coding scheme is particularly beneficial when applied to video transmission over the Internet and wireless channels. One advantage is that the encoded bitstream can adapt to the available bandwidth of the channel without a drifting problem.

Figure 5:
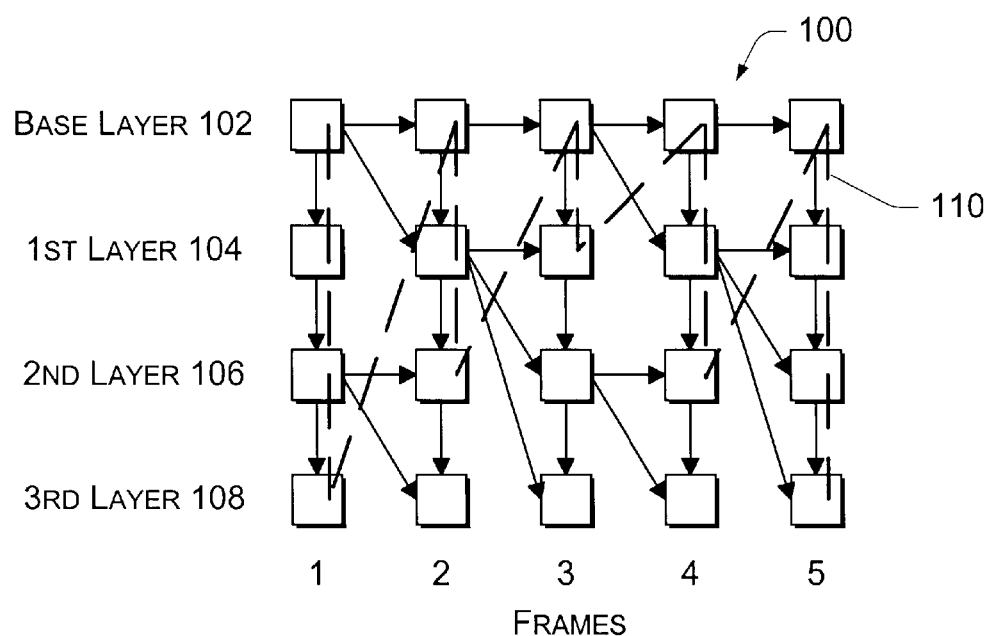
FIG. 5 is similar to FIG. 4 and further shows how the number of layers that are transmitted over a network can be dynamically changed according to bandwidth availability.

FIG. 5 shows an example of this bandwidth adaptation property for the same coding scheme 100 of FIG. 4. A dashed line 110 traces the transmitted video layers. At frames 2 and 3, there is a reduction in bandwidth, thereby limiting the amount of data that can be transmitted. At these two frames, the server simply drops the higher layer bits (i.e., the third layer 108 is dropped from frame 2 and the second and third layers 106 and 108 are dropped from frame 3). However after frame 3, the bandwidth increases again, and the server transmits more layers of video bits. By frame 5, the decoder at the client can once again obtain the highest quality video layer.

Figure 6:
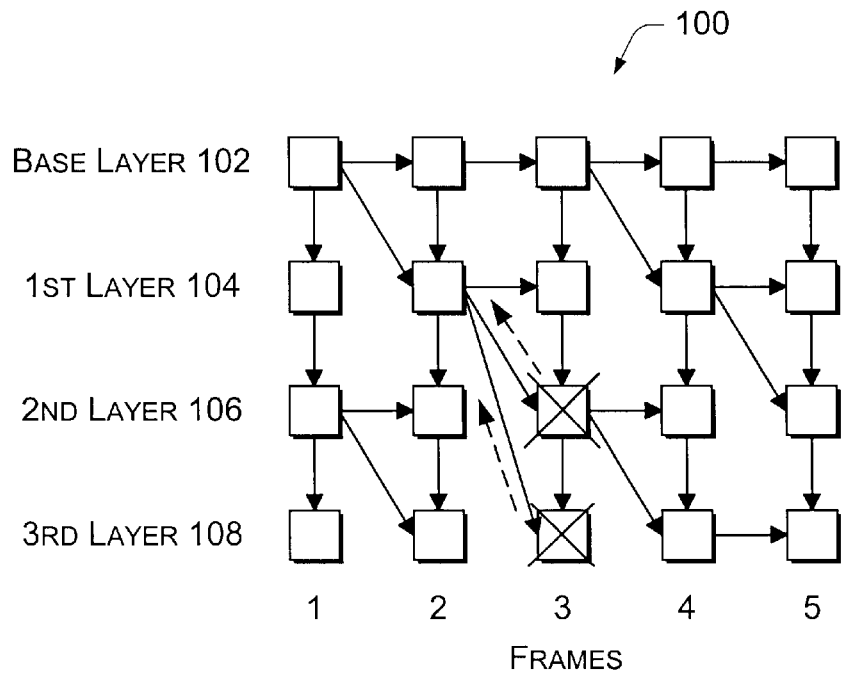
FIG. 6 is similar to FIG. 4 and further shows how missing or error-infested layers can be reconstructed from a reference layer in a reconstructed frame.

Another advantage is that higher video layers, which may not have successfully survived transmission or may have contained an error, may be recovered from lower layers after a number of preset frames. FIG. 6 shows an example in which the third and fourth layers of frame 3 are not correctly received at the receiving client. In this case, the third layer 106 of frame 3 may be reconstructed in part from the first layer 104 of preceding reference frame 2, as represented by the dashed arrow. As a result, there is no need for any re-encoding and re-transmission of the video bitstream. All layers of video are efficiently coded and embedded in a single bitstream.

Another advantage of the coding scheme is that it exhibits a very nice error resilience property when used for coding macroblocks. In error-prone networks (e.g., the Internet, wireless channel, etc.), packet loss or errors are likely to occur and sometimes quite often. How to gracefully recover from these packet losses or errors is a topic for much active research. With the layered coding scheme 100 of FIG. 4, it can be shown that as long as the base layer 102 does not have any packet loss or error, the packet losses/errors in the higher layers can always be gracefully recovered over a few frames without any re-transmission and drifting problem.

Figure 7:
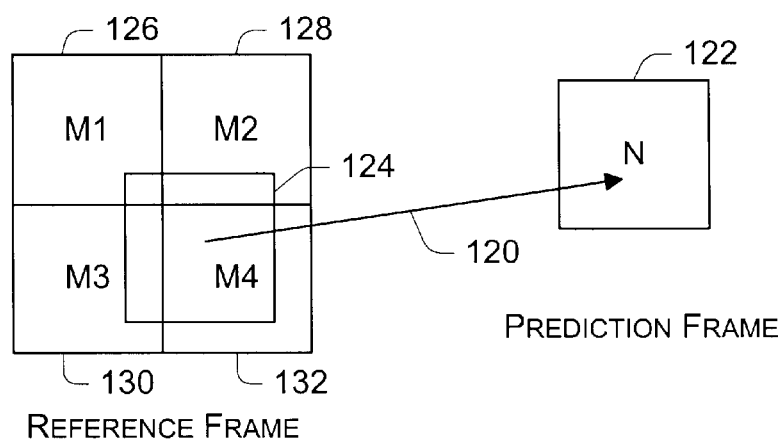
FIG. 7 is a diagrammatic illustration of a macroblock in a prediction frame predicted from a reference macroblock in a reference frame according to a motion vector.

FIG. 7 shows an example in which a motion vector 120 of a macroblock (MB) 122 in a prediction frame points to a reference macroblock 124 in a reference frame. The reference MB 124 does not necessarily align with the original MB boundary in the reference frame. In a worst case, the reference MB 124 consists of pixels from four neighboring MBs 126, 128, 130, and 132 in the reference frame.

Now, assume that some of the four neighboring MBs 126–132 have experienced packet loss or error, and each of them has been reconstructed to the maximum error free layer. For example, MBs 126–132 have been reconstructed at layers M1, M2, M3, and M4, respectively. The reference MB 124 is composed by pixels from the reconstructed four neighboring MBs 126–132 in the reference frame at a layer equal to the minimum of the reconstructed layers (i.e., min(M1,M2,M3,M4)). As a result, the MB 122 being decoded in the prediction frame is decoded at a maximum layer equal to:

1+min(M1,M2,M3,M4)

As a result, no drifting error is introduced and an error-free frame is reconstructed over a few frames depending on the number of layers used by the encoder.

Figure 8:
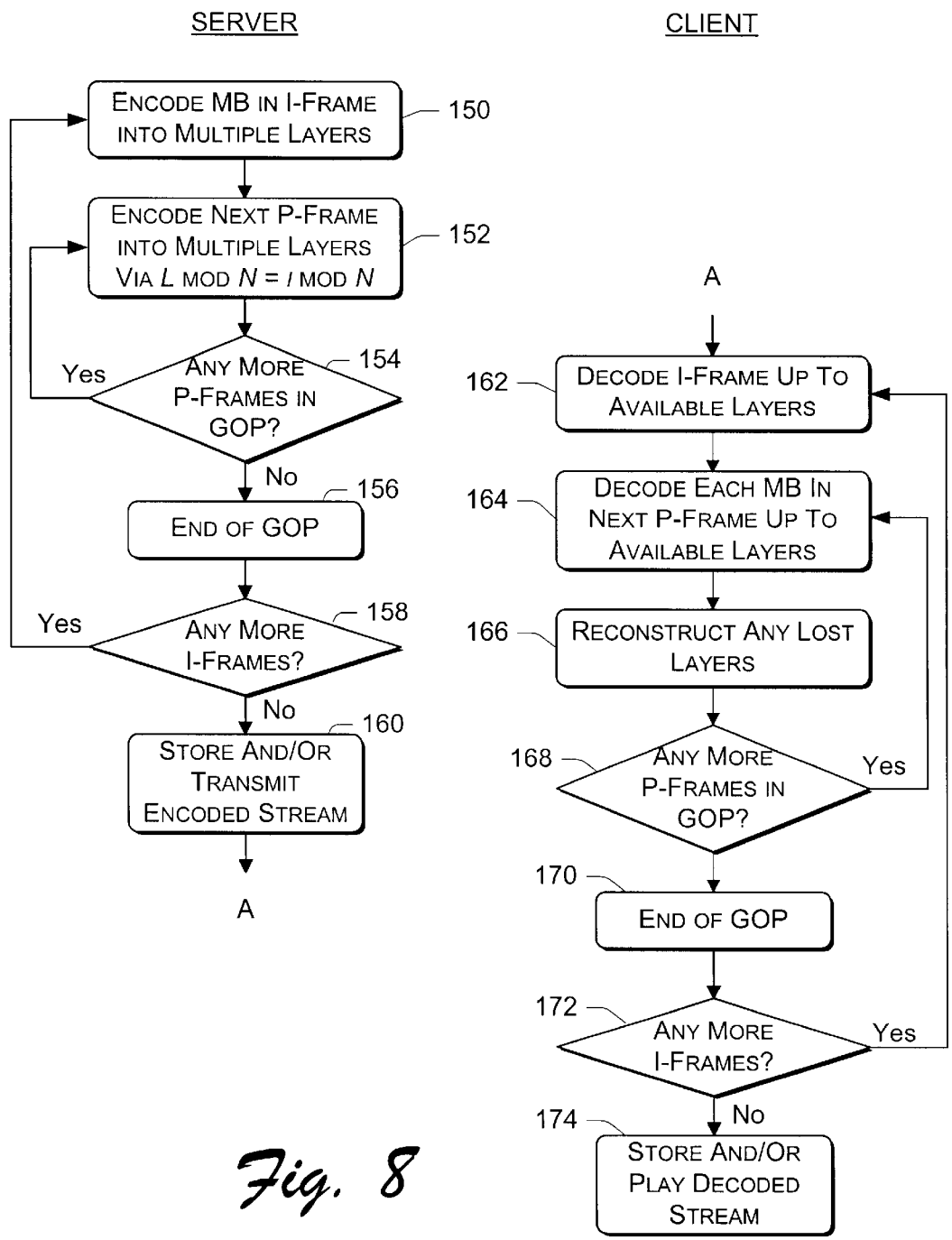
FIG. 8 is a flow diagram showing a method for encoding video data using the layered coding scheme illustrated in FIG. 4.

FIG. 8 shows a general layered coding process implemented at the server-side encoder 80 and client-side decoder 98. The process may be implemented in hardware and/or software. The process is described with reference to FIG. 3.

At step 150, the encoder 80 encodes each macroblock in a reference or intraframe (or "I-frame") into different layers. With reference to FIG. 4, suppose that frame 1 is an I-frame, and the encoder 80 forms the base and three enhancement layers 102–108. At step 152, the encoder 80 encodes each predicted frame (or "P-frame") into different layers. Suppose that frame 2 is a P-frame. The encoder 80 encodes the base layer 102 of frame 2 according to conventional techniques and encodes the enhancement layers 104–108 of frame 2 according to the relationship L mod N=i mod M.

At step 154, the encoder evaluates whether there are any more P-frames in the group of P-frames (GOP). If there are (i.e., the "yes" branch from step 154), the next P-frame is encoded in the same manner. Otherwise, all P-frames for a group have been encoded (step 156).

The process continues until all I-frames and P-frames have been encoded, as represented by the decision step 158. Thereafter, the encoded bitstream can be stored in its compressed format in video storage 70 and/or transmitted from server 74 over the network 64 to the client 66 (step 160). When transmitted, the server transmits the base layer within the allotted bandwidth to ensure delivery of the base layer. The server also transmits one or more enhancement layers according to bandwidth availability. As bandwidth fluctuates, the server transmits more or less of the enhancement layers to accommodate the changing network conditions.

The client 66 receives the transmission and the decoder 98 decodes the I-frame up to the available layer that successfully made the transmission (step 162). The decoder 98 next decodes each macroblock in each P-frame up to the available layers (step 164). If one or more layers were not received or contained errors, the decoder 98 attempts to reconstruct the layer(s) from the lower layers of the same or previous frame(s) (step 166). The decoder decodes all P-frames and I-frames in the encoded bitstream (steps 168–172). At step 174, the client stores and/or plays the decoded bitstream.

Exemplary Video Encoder

Figure 9:
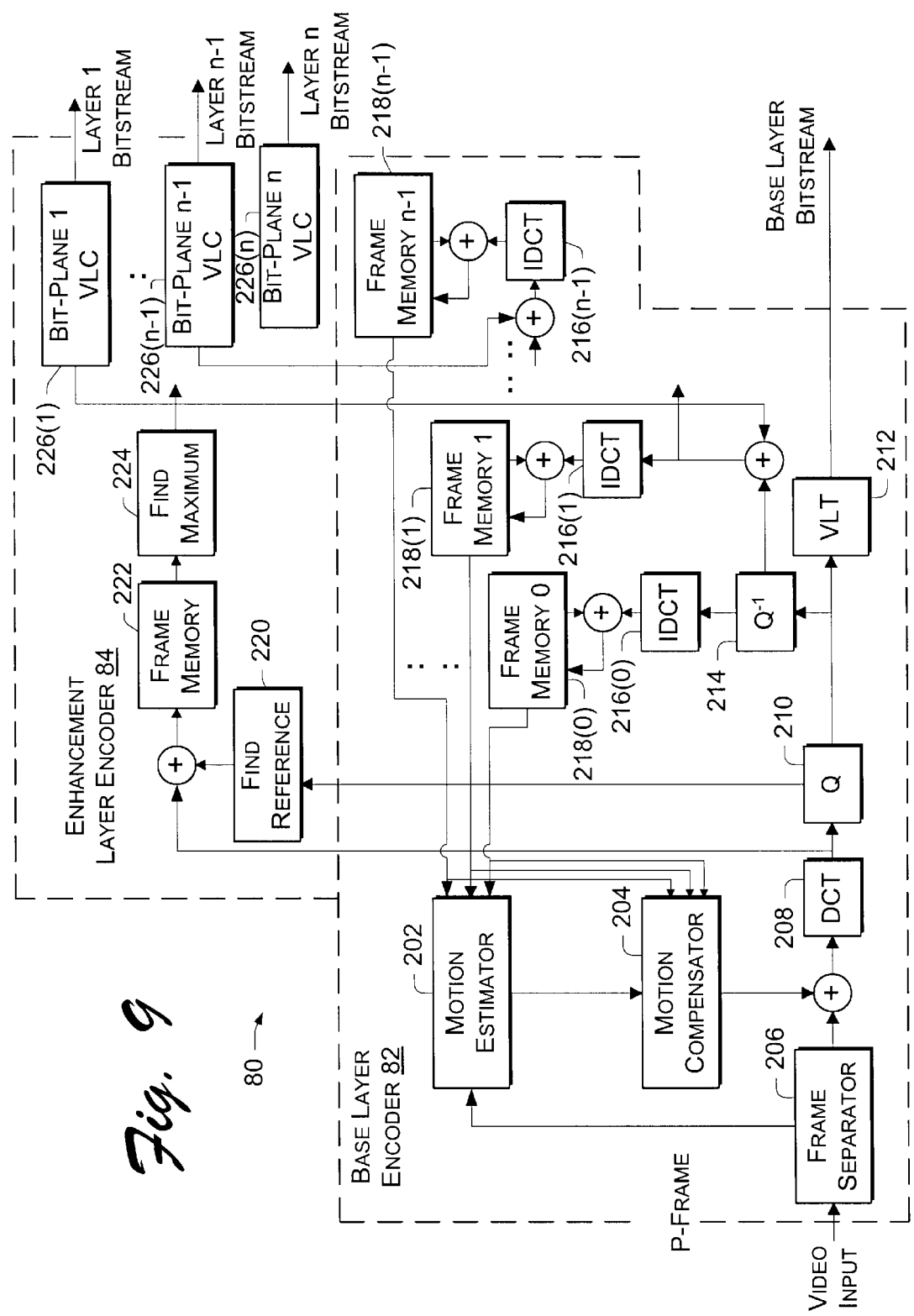
FIG. 9 is a block diagram of an exemplary video encoder implemented at the content producer/provider.

FIG. 9 shows an exemplary implementation of video encoder 80, which is used by server 74 to encode the video data files prior to distribution over the network 64 (FIG. 3). The video encoder 80 is configured to code video data according to the layered coding scheme illustrated in FIG. 4, where both the layer group depth N and the frame group depth M equal two.

Video encoder 80 has a base layer encoder 82 and an enhancement layer encoder 84, which are delineated by dashed boxes. It includes a frame separator 202 that receives the video data input stream and separates the video data into I-frames and P-frames. The P-frames are sent to a motion estimator 204 to estimate the movement of objects from locations in the I-frame to other locations in the P-frame. The motion estimator 204 also receives as reference for the current input, a previous reconstructed frame stored in frame memory 0 as well as reference layers with different SNR (signal-to-noise ratio) resolutions stored in frame memories 0 to n–1.

According to the coding scheme described above with respect to FIG. 4, the current layer is predicted from the next lower layer of a preceding reference reconstructed frame to make the motion prediction as accurate as possible. For example, enhancement layer j is predicted by layer j–1 of the reference reconstructed frame stored in frame memory j–1. The motion estimator 204 outputs its results to motion compensator 206. The motion estimator 204 and motion compensator 206 are well-known components used in conventional MPEG encoding.

In base layer coding, a displaced frame difference (DFD) between the current input and base layer of the reference reconstructed frame is divided into 8×8 blocks. A block k of the DFD image in the base layer at a time t is given as follows:

$$\Delta f_{t,0}(k) = \sum_{x \in block(k)} \sum_{y \in block(k)} \|f_t(x,y) - \hat{f}_{t-1,0}(x - \Delta x, y - \Delta y)\|$$

The result $\Delta f_{t,0}(k)$ is an 8×8 matrix whose element is a residue from motion compensation, f(x,y) is the original image at time t, and $f_{t-1,0}(x,y)$ is a base layer of the reference reconstructed image at time t–1. The vector $(\Delta x, \Delta y)$ is a motion vector of block k referencing to $f_{t-1,0}(x,y)$.

The residual images after motion compensation are transformed by a DCT (Discrete Cosine Transform) module 208 and then quantified by a quantification function Q at module 210. The bitstream of the base layer is generated by translating the quantified DCT coefficients using a variable length table (VLT) 212, as follows:

$$B_0 = \sum_k VLT(Q(DCT(\Delta f_{t-1,0}(k))))$$

The base layers of the frames are also passed through a dequantization function $Q^{-1}$ at module 214. Accordingly, the dequantized DCT coefficients in the base layer are:

$$R_{t,0}(k) = Q_q^{-1}(Q_q(DCT(\Delta f_{t,0}(k))))$$

The result $R_{t,0}(k)$ is an 8×8 matrix, whose element is a DCT coefficient of $\Delta f_{t,0}(k)$. The DCT coefficients are passed to n frame memory stages. In all stages other than a base stage 0, the DCT coefficients are added to coefficients from the enhancement layer encoder 84. The coefficients are then passed through inverse DCT (IDCT) modules 216(0), 216(1), . . . , 216(n–1) and the results are stored in frame memories 218(0), 218(1), . . . , 218(n–1). The contents of the frame memories 218 are fed back to the motion estimator 204.

With base layer coding, the residues of block k in the DCT coefficient domain are:

$$\Delta R_{t,0}(k) = DCT(\Delta f_{t,0}(k)) - R_{t,0}(k)$$

The enhancement layer encoder 84 receives the original DCT coefficients output from DCT module 208 and the quantified DCT coefficients from the quantizer module 210 and produces an enhancement bitstream. After taking residues of all DCT coefficients in an 8×8 block, the find reference module 220 forms run length symbols to represent the absolute values of the residue. The 64 absolute values of the residue block are arranged in a zigzag order into a one-dimensional array and stored in memory 222. A module 224 computes the maximum value of all absolute values as follows:

$$m = \max(\Delta R_{t,0}(k))$$

The minimum number of bits needed to represent the maximum value m in a binary format dictates the number of enhancement layers for each block. Here, there are n bit planes 226(1)–226(n) that encode n enhancement layers using variable length coding (VLC).

The residual signal of block k of the DFD image in the enhancement layer at a time t is given as follows:

$$\Delta f_{t,i}(k) = \sum_{x \in block(k)} \sum_{y \in block(k)} \left\| f_t(x, y) - \hat{f}_{t-1,i-1}(x - \Delta x, y - \Delta y) \right\|$$

where $1 \leq i \leq n$. The encoding in the enhancement layer is as follows:

$$R_{t,i}(k) = 2^{n-i} \left[ DCT(\Delta f_{t,i}(k)) - \sum_{j=0}^{i-1} R_{t,j}(k) \right]_{2^{n-i}}$$

The bracketed operation [*] is modular arithmetic based on a modulo value of $2^{n-i}$. After encoding the enhancement layer i, the residues in DCT coefficient domain are:

$$\Delta R_{t,i}(k) = DCT(\Delta f_{t,i}(k)) - \sum_{j=0}^{i} R_{t,j}(k)$$

The bitstream generated in enhancement layer i is:

$$B_i = \sum_{k} VLT \left( \left[ DCT(\Delta f_{t,i}(k)) - \sum_{j=0}^{i} R_{t,j}(k) \right]_{2^{n-i}} \right)$$

At time t, the summary value of DCT coefficient of block k, which is encoded in based layer and enhancement layers, is:

$$sum(k) = \sum_{i=0}^{n} R_{t,i}(k)$$

Figure 10:
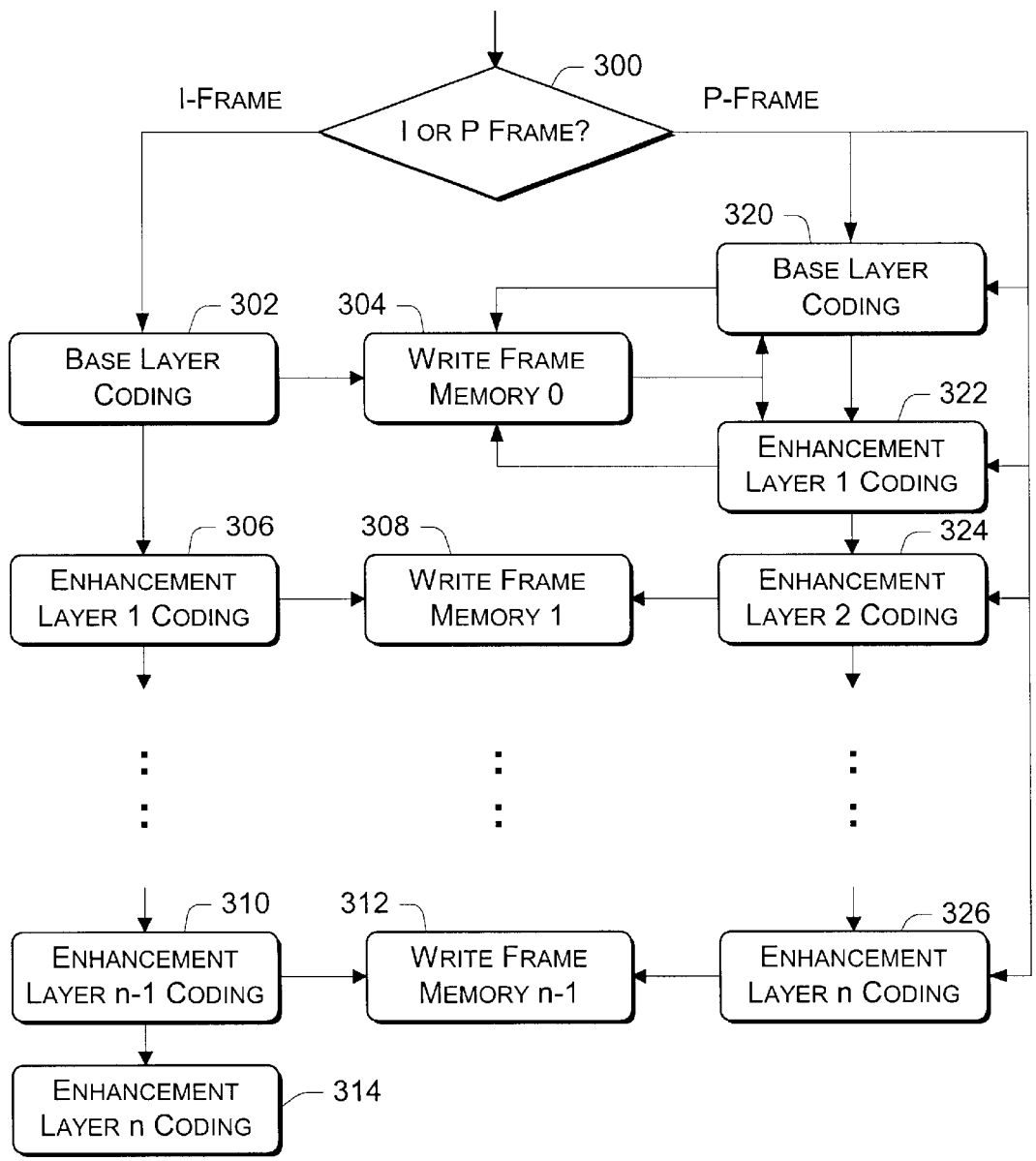
FIG. 10 is a flow diagram showing a method for encoding video data that is implemented by the video encoder of FIG. 9.

FIG. 10 shows an encoding process implemented by the video encoder of FIG. 9. At step 300, the video encoder distinguishes between an I-frame and a P-frame. For I-frame encoding, the video encoder generates the corresponding bitstream and updates the various frame memories 218(0)–218(n-1). For instance, the base layer is encoded and stored in frame memory 0 (steps 302 and 304). The enhancement layer 1 is coded and stored in frame memory 1 (steps 306 and 308). This continues for all enhancement layers 1 to n, with the coding results of enhancement layer n-1 being stored in frame memory n-1 (steps 310, 312, and 314).

For P-frame encoding, the video encoder performs motion compensation and transform coding. Both the base layer and first enhancement layer use the base layer in frame memory 0 as reference (steps 320 and 322). The coding results of these layers in the P-frame are also used to update the frame memory 0. The remaining enhancement layers in a P-frame use the next lower layer as reference, as indicated by enhancement layer 2 being coded and used to update frame memory 1 (step 324) and enhancement layer n being coded and used to update frame memory n-1 (step 326).

It is noted that the encoder of FIG. 9 and the corresponding process of FIG. 10 depict n frame memories 218(0)–218(n-1) for purposes of describing the structure and clearly conveying how the layering is achieved. However, in implementation, the number of frame memories 218 can be reduced by almost one-half. In the coding scheme of FIG. 4, for even frames (e.g., frames 2 and 4), only the even layers of the previous frame (e.g., $2^{nd}$ layer 106 of frames 1 and 3) are used for prediction and not the odd layers. Accordingly, the encoder 80 need only store the even layers of the previous frame into frame memories for prediction. Similarly, for odd frames (e.g., frames 3 and 5), the odd layers of the previous frame (e.g., $1^{st}$ and $3^{rd}$ layers 102 and 108 of frames 2 and 4) are used for prediction and not the even layers. At that time, the encoder 80 stores only the odd layers into the frame memories for prediction. Thus, in practice, the encoder may be implemented with n/2 frame buffers to accommodate the alternating coding of the higher enhancement layers. In addition, the encoder employs one additional frame memory for the base layer. Accordingly, the total number of frame memories required to implement the coding scheme of FIG. 4 is (n+1)/2.

Potential Coding Inefficiencies Due To Prediction From Multiple Reference Layers In the PFGS layered coding scheme described above, images are predicted from the original image by referencing a base layer and an enhancement layer from a previous frame. In FIG. 4, the base and enhancement layers in frame 2 reference the base layer and second enhancement layer in previous frame 1. The base and enhancement layers in frame 3 reference the base layer and first enhancement layer in previous frame 2. Since the quality of an enhancement layer is higher than that of the base layer, the PFGS coding scheme makes motion prediction as accurate as possible for any given video layer while maintaining coding efficiency.

Residues resulting from the image frame prediction are defined as the difference between the original image and predicted image. When using the linear DCT transform, the DCT coefficients of predicted residues equal the differences between the DCT coefficients of the original image and the DCT coefficients of the predicted image. Since the coding scheme in FIG. 4 uses two reference layers for the prediction, the coding scheme produces two sets of predicted DCT coefficients: (1) a first set of predicted DCT coefficients of the predicted image that is formed by referencing a low quality reference layer, such as the base layer, and (2) a second set of predicted DCT coefficients of the predicted image that is formed by referencing a higher quality reference layer, such as an enhancement layer. For a convenience, the first set of DCT coefficients are called the Low Quality Predicted DCT (LQPD) coefficients and the second set of DCT coefficients are called the High Quality Predicted DCT (HQPD) coefficients. It is noted that in other coding schemes, more than two sets of predicted DCT coefficients might be generated.

The expectation is that the HQPD coefficients will produce lower DCT residues, thereby resulting in more efficient coding, because the reference layer is of higher quality and hence closer to the original image. While this is true from a mean perspective, there are individual DCT residues in the HQPD coefficients that actually increase in comparison to DCT residues produced by referencing a lower quality layer (i.e., residues in the LQPD coefficients). The undesired increase is due to the motion between frames and other reasons, and results in a less efficient coding as more data are needed to encode the residues.

FIGS. 11–17 present an example of how use of higher quality references may introduce unexpectedly high residues (in comparison to lower quality references). In this example, the data is selected from the 398$^{th}$ block of the 3$^{rd}$ frame of a sequence known as "Coastguard", a well-known MPEG test sequence.

FIG. 11 illustrates a set of low quality predicted DCT (LQPD) coefficients of a predicted layer 400 that is predicted from a base layer in the 398$^{th}$ block of the 3$^{rd}$ frame of the "Coastguard" sequence. The predicted layer 400 contains LQPD coefficients for an 8×8 array of pixels. The LQPD coefficients are quantized prior to encoding into the bit-stream.

FIG. 12 shows a predicted base layer 402 that is produced by quantizing the LQPD coefficients of FIG. 11 with a quantized step of seven. The quantized DCT coefficients in layer 402 are compressed into the bit-stream of base layer using a coding process, such as variable length coding. The quantized LQPD coefficients in layer 402 are subsequently dequantized in order to determine how extensive the quantization errors are. The differences between the LQPD coefficients in layer 400 and the dequantized LQPD coefficients in layer 402 form residues in the DCT domain. The DCT residues are compressed using bit-plane coding to form the bit-stream of the enhancement layers. The DCT residues are represented in binary numbers and hence can be coded as several bit-plane layers according to the binary value. The maximum number of bit-plane levels is set to the number of bits needed to represent the maximum residual value in binary format.

Figure 13:
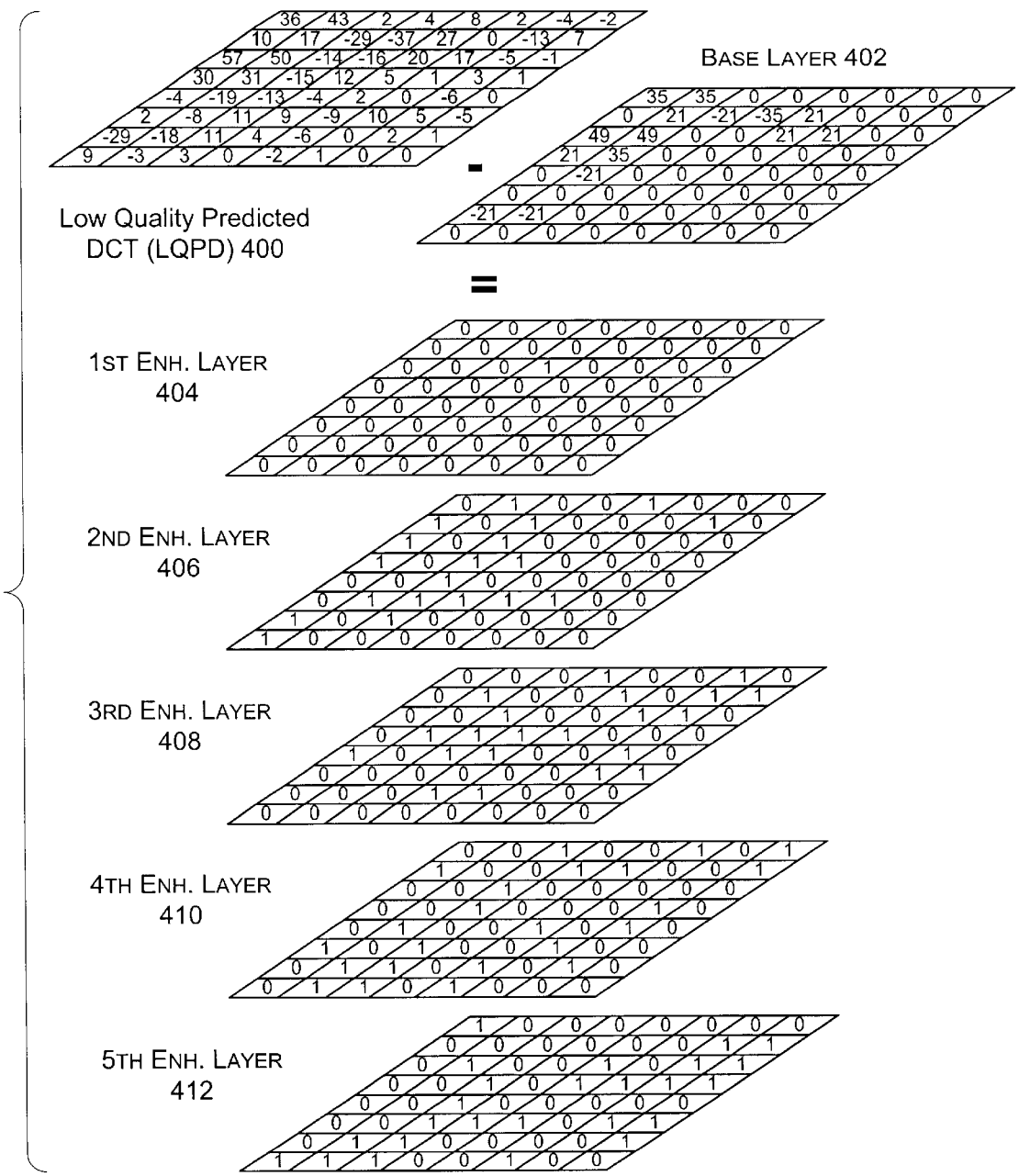
FIG. 13 is a diagrammatic illustration of the multiple enhancement layers used to encode residues resulting from a difference between the coefficients in the FIG. 11 layer and the FIG. 12 layer.

FIG. 13 shows five enhancement layers 404, 406, 408, 410, and 412 that are used to encode the DCT residues resulting from the differences between the LQPD coefficients in layer 400 and the dequantized LQPD coefficients in layer 402. In this case, the maximum DCT residue is 16, which can be represented by a five-digit binary number "10000" and encoded using the five enhancement layers 404–412. Consider the coefficients in location (1,1) of the 8×8 arrays. The LQPD coefficient of layer 400 is "36" and the dequantized LQPD coefficient of base layer 402 is "35". The difference is "1" (i.e., 36−35=1), which can be represented in a five-digit binary value as "00001". Accordingly, the locations (1,1) of each enhancement layers 404–412 collectively define the value "00001".

Each DCT coefficient in the base layer is encoded with a sign bit. In the enhancement layers, the absolute residual values are encoded within the multiple layer structure and their sign bits are encoded once. The sign bit is separately encoded and thus the layer structure of FIG. 13 presents the absolute residual value of the DCT coefficient. Generally, the sign bit of each residual value is encoded with one bit following the most significant layer. The binary "1" denotes a positive and binary "0" denotes a negative. For instance, the sign bit in location (3, 4) is encoded to "0" in the 1st enhancement layer 404 and the sign bit in location (1, 2) is encoded to "1" in the 2nd enhancement layer 406.

According to the layer structure in FIG. 13, the low enhancement layers (e.g., first and second enhancement layers 404 and 406) effectively encode the larger or more significant bits of the DCT residues. Consider, for example, the DCT residue corresponding to array location (1, 2), which is 8 (i.e., 43−35=8). This value is encoded as "01000", which results in a "1" bit in the second enhancement layer 406. Similarly, a larger residue occurs at location (3,4), which causes a "1" bit in the first enhancement layer 404.

All DCT coefficients that are encoded in the base layer and one or more enhancement layers are collectively called "Encoded DCT" or "ECD". Suppose, for example, the first enhancement layer 404 is encoded as a low enhancement layer. The ECD coefficients are the sum of DCT coefficients in the base layer 402 and the first enhancement layer 404.

Figure 14:
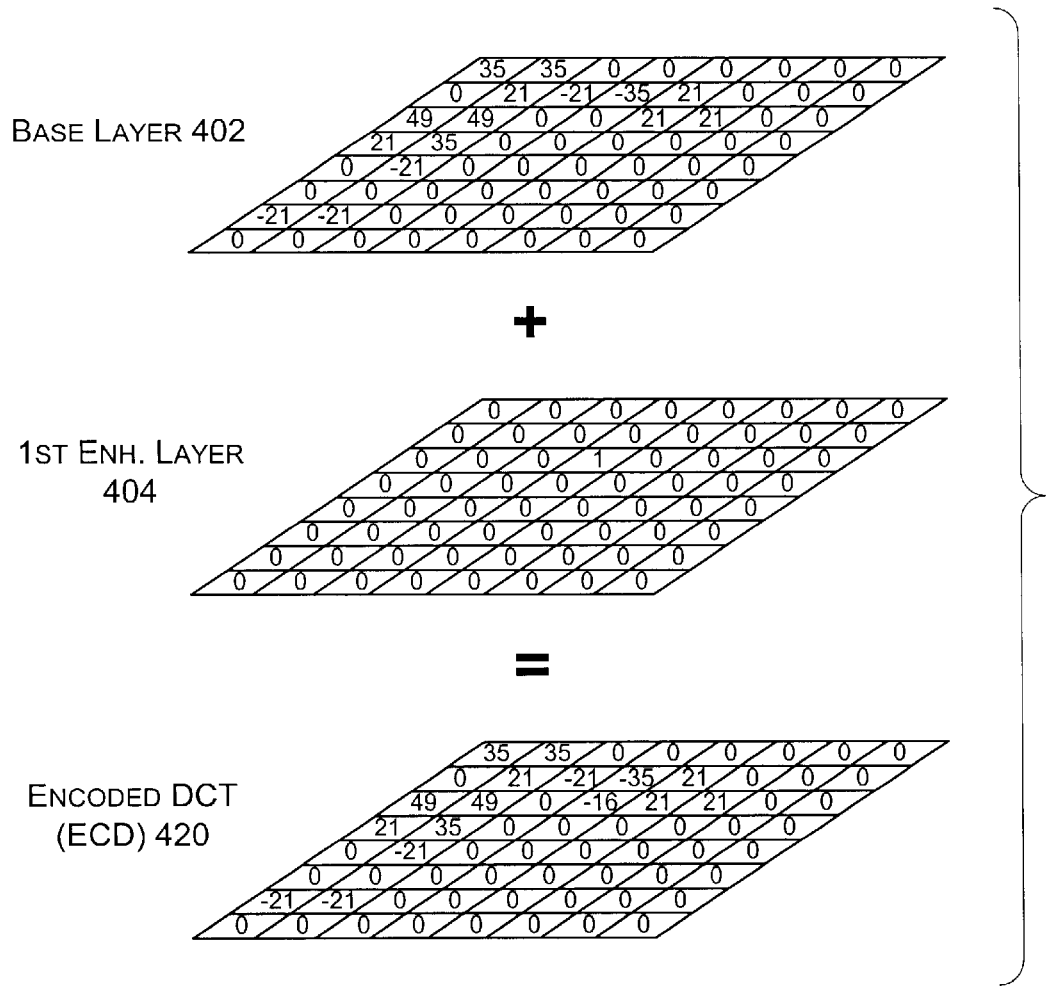
FIG. 14 is a diagrammatic illustration a set of coefficients that are encoded in the base layer and first enhancement layer.

FIG. 14 illustrates the encoded DCT coefficients 420 in the base layer 402 and the first enhancement layer 404. Notice that the first enhancement layer 404 has a single binary "1" at location (3,4) in the 8×8 array. This "1" bit is the most significant bit in a five-bit number "1xxxx", and thus represents the value 16. Adding 16 to the value "0" in the corresponding location (3,4) of the base layer 402 yields an absolute encoded value of "16", as shown in the encoded layer 420 at location (3,4). Again, the negative sign is dictated the following one bit. In this case, the following bit is "0", indicating a negative.

FIG. 15 shows the low quality DCT residues in layer 430 that are derived from the differences between the LQPD coefficients in layer 400 (FIG. 11) and the ECD coefficients in layer 420 (FIG. 14). The residues range from a maximum absolute value of 15 in location (4,3) to a minimum absolute value of 0.

FIG. 16 illustrates an exemplary set of high quality predicted DCT (HQPD) coefficients of a predicted enhancement layer 440 that is predicted from the second enhancement layer in the 398$^{th}$ block of the 3$^{rd}$ frame of the "Coastguard" sequence. Since the higher quality enhancement layer is used for reference, the predicted image is expected to be closer to the original image. As a result, the expectation is that the residues associated with the HQPD coefficients should be smaller than the residues associated with the LQPD coefficients, thereby enabling a higher coding efficiency. However, this is not always the case.

FIG. 17 shows the high quality DCT residues in a layer 450 that are derived from the differences between the HQPD coefficients in layer 430 and the ECD coefficients in layer 420. Comparing high quality DCT residues with the low quality DCT residues in layer 430 (FIG. 15), it is evident that the residues vary widely. That is, there is fluctuation in residue values caused by the utilization of different quality layers as references. It is also evident that not all individual high quality DCT residues are smaller than their counterpart low quality DCT residues. For instance, the high quality DCT residues of "29" and "10" at locations (2,1) and (1,2) are larger than the corresponding low quality DCT residues of "10" and "8", respectively. Moreover, the high quality DCT residue at location (2,1) is "29", which exceeds the encoding range allowed by residual four bit planes because the enhancement layer 1 is already formed as part of the bitstream. In this case, the coding efficiency will rapidly decrease due to poor luck that a good method results in exceeding the number of available bit planes. While the mean square of the high quality DCT coefficients is smaller than the mean square of the low quality DCT coefficients, there remain some individual DCT residues that fluctuate due to using different quality layers as references.

Advance Predicted Bit-Plane Coding To Improve Coding Efficiencies

Figure 1:
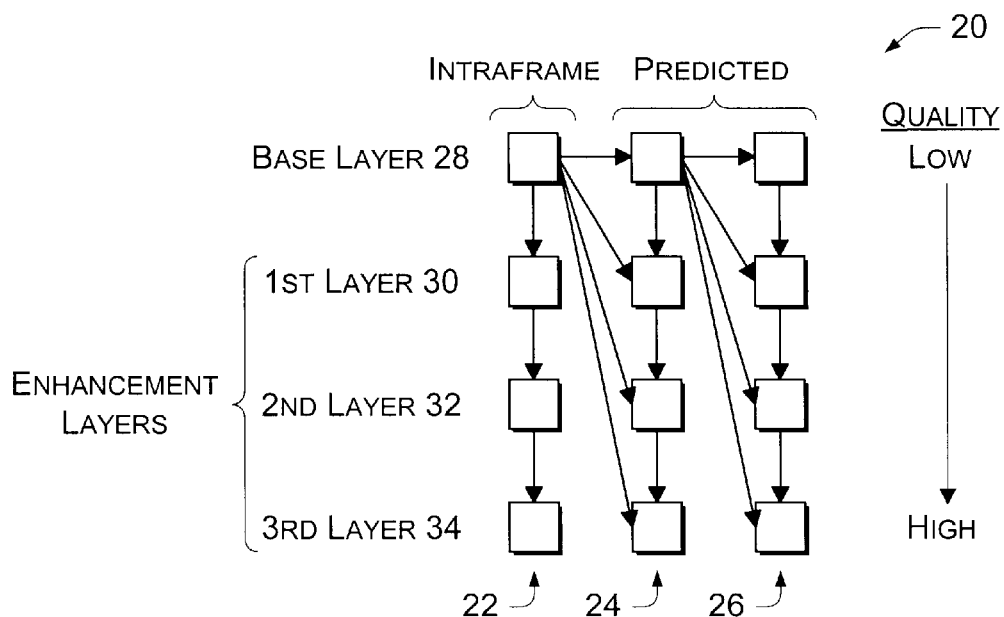
FIG. 1 is a diagrammatic illustration of a prior art layered coding scheme in which all higher quality layers can be predicted from the lowest or base quality layer.
Figure 2:
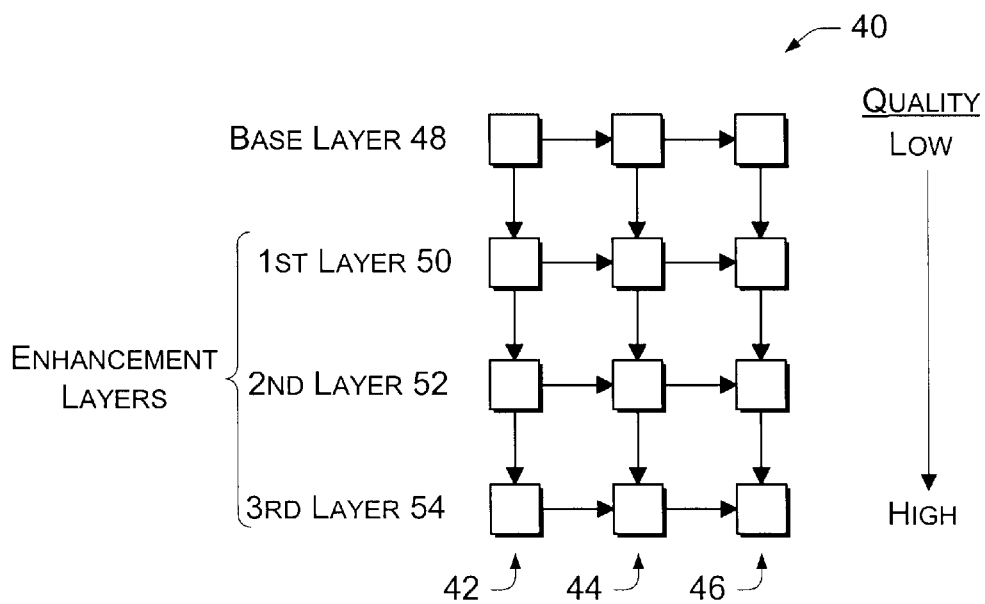
FIG. 2 is a diagrammatic illustration of a prior art layered coding scheme in which frames are predicted from their corresponding quality layer components in the intraframe or reference frame.

The video distribution system 60 (FIG. 2) is configured to efficiently eliminate the fluctuation caused by using multiple prediction references of different quality. Ideally, to eliminate this fluctuation, the HQPD coefficients should also be encoded in the base layer and low enhancement layers. However, in practice, only the LQPD coefficients are actually encoded in the base layer and low enhancement layers. Accordingly, to efficiently eliminate the fluctuation in residues, the HQPD coefficients are predicted from the DCT coefficients encoded in the base layer and enhancement layer.

Accordingly, the video encoder 80 is configured to predict the HQPD coefficients from the DCT coefficients of two reference layers and the encoded DCT (ECD) coefficients. Although, the HQPD coefficients are not expressly available in the decoder 98, the DCT coefficients of the reference layers and the encoded DCT coefficients are available both in the encoder and in the decoder. As illustrated in FIG. 3, the encoder 80 and the decoder 98 are equipped with advance prediction bit-plane coders (ABPIC) 86 and 99, respectively, that perform the prediction of the HQPD coefficients for the bit-plane coding.

The following discussion presents two possible methods for predicting coefficients that may be used to minimize or eliminate fluctuations in the residues. The first method is able to recover reconstructed image without loss. The second method will bring some minor error to reconstructed images in all layers, but it is very suitable to real-time application due to low computational complexity.

A. Prediction Method 1

To demonstrate how the HQPD coefficients are predicted, first consider the LQPD coefficients, which can be represented as follows:

$$LQPD = DCT_o - DCT_1 \quad (1)$$

where $DCT_o$ denotes the DCT coefficients of the original image and $DCT_1$ denotes the DCT coefficients of the predicted image of a previous base layer after motion compensation. The reconstructed DCT coefficients encoded in base layer and low enhancement layer can be described as:

$$ECD = \lceil \lfloor LQPD \rfloor_Q \rceil_{Q^{-1}} \quad (2)$$

The modular function $\lfloor * \rfloor_Q$ denotes a complex quantization, which includes the scalar quantization in the base layer and the bit-plane quantization in the low enhancement layer. The modular function $\lceil * \rceil_{Q^{-1}}$ denotes an inverse quantization with respect to the complex quantization. The value Q is not only the quantized step in scalar quantization, but denotes quantized parameters including scalar quantization and bit-plane quantization.

The HQPD coefficients are represented as follows:

$$HQPD = DCT_o - DCT_h \quad (3)$$

where $DCT_h$ denotes the DCT coefficients of the predicted image of a previous enhancement layer after motion compensation.

To eliminate the residue fluctuation between low and high quality predictions, the coding scheme predicts an ECD value, EĈD, that corresponds to the HQPD coefficients.

$$E\hat{C}D = \lceil \lfloor HQPD \rfloor_Q \rceil_{Q^{-1}} \quad (4)$$

Integrating equations (1), (2) and (3) into (4), a predicted ECD value is obtained as follows:

$$E\hat{C}D = \lceil \lfloor DCT_0 - DCT_h \rfloor_Q \rceil_{Q^{-1}} \quad (5)$$
$$= \lceil \lfloor DCT_0 - DCT_l + (DCT_l - DCT_h) \rfloor_Q \rceil_{Q^{-1}}$$
$$= \lceil \lfloor ECD + (LQPD - ECD) + (DCT_l - DCT_h) \rfloor_Q \rceil_{Q^{-1}}$$
$$= \lceil \lfloor \{ECD + (DCT_l - DCT_h)\} + \{LQPD - ECD\} \rfloor_Q \rceil_{Q^{-1}}$$

From equation (5), the predicted value EĈD consists of two parts. The first term involves the encoded DCT value ECD and the DCT coefficients of two predicted images $DCT_l$ and $DCT_h$. The elements in this first term are available at both the encoder 80 and the decoder 98.

The second item is a quantized error corresponding to the LQPD coefficients that will be encoded in the high enhancement layers. This second item is not available for the decoder 98. However, its probability density distribution can be used to predict EĈD. Two possible distributions that may be used are the Laplacian distribution and the Generalized Gaussian Density (GGD) distribution. For the Laplacian distribution, an article by R. C. Reininger and J. D. Gibson, entitled "Distribution of the two-dimensional DCT coefficients for images", IEEE trans. comm. Vol 31, 835–839, (1983) describes use of Kolmogrov-Smirnov tests to show that most DCT coefficients of images are reasonably well modeled as Laplacian distributions. GGD is described in an article by F. Muller, entitled "Distribution shape of two-dimensional DCT coefficients of natural image", Electron.Letter, Vol 29, 1935–1936, (1993) where the author shows that modeling the DCT coefficients of images with the GGD function results in a significantly smaller test statistic $\chi^2$ compared with Laplacian.

The GGD distribution is more preferred because the DCT coefficients of the inter frame can be modeled with zero-mean GDD. Recall that the Generalized Gaussian Density function is given as:

$$p(x) = \left[ \frac{v\eta(v, \sigma_x)}{2\Gamma(1/v)} \right] \exp(-[\eta(v, \sigma_x)|x|]^v) \quad (6)$$

where $\eta(v, \sigma_x) = \sigma_x^{-1} \left[ \frac{\Gamma(3/v)}{\Gamma(1/v)} \right]^{1/2}$ Here, $\sigma_x$ is the standard deviation and v is a shape parameter. For a Gaussian density, the shape parameter is two (i.e., v=2.0), while for a Laplacian distribution, the shape parameter is one (i.e., v=1.0). A GGD source for a set of samples can be quickly and accurately modeled using derived parameters. This flexibility of the shape parameter v in the GGD shape allows for the efficient capture of diverse statistical characteristics of DCT coefficients.

The formula (5) can be rewritten as the sum of sign X with a GGD distribution and a noise $\epsilon$ with Gaussian distribution:

$$Y = X + \epsilon \quad (7)$$

where $X = ECT + DCT_l - DCT_h$ and $\epsilon = LQPD - ECD$.

Because the noise $\epsilon$ is an unknown variable for the decoder, the precise Y is unavailable at the decoder. The predicted value EĈD is derived from an optimal quantizing Y with its statistic distributed properties, including steps of zero bin and non-zero bin. One issue concerns how to calculate the steps of zero bin and non-zero bin.

$$\hat{Y} = \lfloor Y \rfloor_\theta \quad (8)$$

where $\theta$ is the optimal quantized parameter.

The optimal quantization bins are those that cause the following distortion criterion to be minimized.

$$r(T) = E_X E_{Y|X} (\hat{Y} - X)^2 \quad (9)$$

where $X \sim GGD_{v, \sigma_x}(x)$
$Y/X \sim N(x, \sigma)$

The parameter $\sigma$ denotes the standard variance of sign $\epsilon$. Due to the generalized Gaussian distribution of X, a methodology described in an article by S. Grace Chang, Bin Yu and Martin Vetterli, entitled "Lossy Compression and Wavelet Thresholding for Image Denoising", which was submitted to IEEE Transactions on Image Processing and is publicly available, obtains a near optimal threshold as follows:

$$T(v, \sigma_x) = \sigma^2 \sqrt{\frac{\eta(v, \sigma_x)\Gamma(1/v)}{\Gamma(3/v)}} \quad (10)$$

The step of zero bin equals two times $T(v,\sigma_x)$. Quantized Y is non-zero if it is larger than T; otherwise, it is set to zero. The parameter $\sigma$ can be estimated from sign $\epsilon$. The parameter $\sigma_x$ and $v$ can be estimated from sign X according to a methodology described in an article by R. L. Joshi and T. R. Fischer, entitled "Comparison of generalized Gaussian and Laplacian modeling in DCT image coding", IEEE signal processing letters, Vol 2, no 5, 81–82, (1995):

$$\hat{\sigma}_x = m_2$$

$$\hat{v} = F^{-1}(m_1/\sqrt{m_2})$$

where $m_1 = \frac{1}{n}\sum_{i=1}^{n}|x_i|$ $$m_2 = \frac{1}{n}\sum_{i=1}^{n}x_i^2$$

$$F(\alpha) = \frac{\Gamma(2/\alpha)}{\sqrt{\Gamma(1/\alpha)\Gamma(3/\alpha)}}$$

The sign X is available both in the encoder 80 and in the decoder 98. The parameter $\sigma_x$ and $v$ can therefore be calculated in the decoder 98 using the same methodology rather than transmitting them as part of the bitstream. Although, the parameter $\sigma$ can not be estimated in the decoder 98, some value with respect to each layer can be empirically derived.

Figure 18:
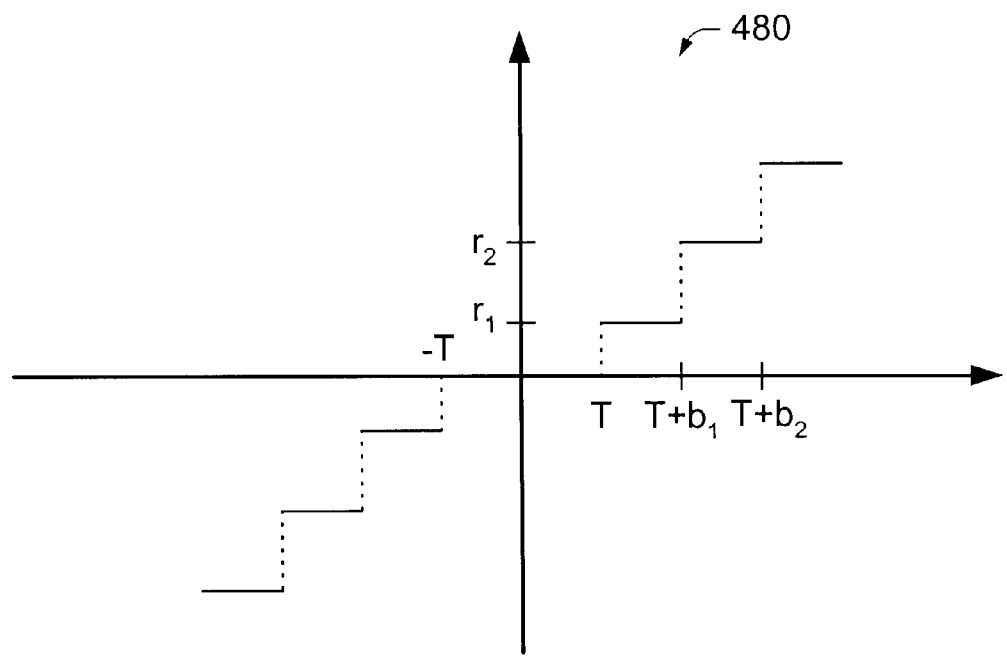
FIG. 18 is a diagrammatic illustration of quantization levels implemented by a uniform threshold quantizer.

The non-zero bin can be determined by quantizing GGD random variables with a uniform threshold quantizer. FIG. 18 shows an exemplary uniform threshold quantizer 480, a center that represents the reconstructed level and non-zero bins with k levels of equal intervals of $\Delta$ on each side of the center. The reconstructed value of $r_l$ with boundaries $b_{l-1}$ and $b_l$ is:

$$r_l = \frac{\int_{b_{l-1}}^{b_l} xp(x)dx}{\int_{b_{l-1}}^{b_l} p(x)dx} \quad (11)$$

The predicted value EĈD equals the dequantization of $\hat{Y}$, or:

$$E\hat{C}D = [\hat{Y}]_\theta^{-1} = \lceil \lfloor Y \rfloor_\theta \rceil_\theta^{-1} \quad (12)$$

The parameter $\theta$ is T for zero-bin; otherwise, it equals $b_l$ for non-zero bins. The above process can get an optimal predicted value EĈD in a statistic sense that can efficiently eliminate the fluctuation. The DCT coefficients encoded in high enhancement layers are the differences between HQPD and predicted value EĈD.

In a special case, DCT residues will still fluctuate as little probability events. For example, X=ECT+$DCT_l$−$DCT_h$ may be a value, which is smaller than the threshold T, but the value LQPD−ECD might still be close to the maximum value presented by residual bit planes. In such cases, the summary may exceed the maximum value by residual bit planes. Suppose the X equals 3, the predicted value EĈD is zero because it is smaller than threshold $\theta$. If LQPD−ECD equals 15, the summary equals 18 which exceeds the encoding range 15 allowed by four residual bit planes. The solution for this case is to quantize LQPD−ECD forward to the low enhancement layer.

For our example, a value LQPD−ECD of 15 can be represented in a five-digit binary value as "01111" and the most significant bit is in enhancement layer 406. The value LQPD−ECD is quantized as 16 and its residue is "−1". Now the most significant bit of the value LQPD−ECD moves forward the enhancement layer 404. It means that in first enhancement layer, the value 16 is encoded and in the last enhancement layer, the value −1 is encoded. As a cost, the two sign bits are encoded in order to avoid the fluctuation exceeding the maximum range. As discussed above, the sign bit is encoded following the MSB. If two sign bits exists, the first sign bit is encoded in the low enhancement layer and the second sign bit is encoded in the layer modifying references.

The two sign bits can be encoded with high efficiency with two prior conditions. Firstly, the second sign bit appears only in the coefficients in which the MSB is encoded in the low enhancement layer. Secondly, the second sign is identical to the first sign in most cases because the fluctuation exceeding the maximum range is a little probability event.

The predicted process is shown as follows:

(1) Set
  $DCT_{th}=DCT_l−DCT_h$, $\Delta DCT=ECD+(DCT_l−DCT_h)$
  Threshold: $Th=2^{k+1}$, k is index layer where changes reference.
  Q is scalar quantized parameter of base layer
  Optimal predict parameter: $q=\theta$ (2) Predict (a) If$(\Delta DCT - Q/2)/(2*Q) <> 0$ $E\hat{C}D = \lfloor\lfloor\Delta DCT\rfloor_q\rfloor_{q^{-1}}$ (b) If$(\Delta DCT - Q/2)/(2*Q) = 0$ (i) if$(DCT_{th} >= Th)$ $E\hat{C}D = \lfloor\lfloor\Delta DCT\rfloor_q\rfloor_{q^{-1}}$ (ii) if$(DCT_{th} >= Th/2)$ if$(ECD <> 0)$ $E\hat{C}D = \Delta DCT$ else$(Q >= 20$ and $DCT_{th} > Th*3/4)$ $E\hat{C}D = \Delta DCT$ (iii) if$(DCT_{th} < Th/2)$ $E\hat{C}D = ECD$ (3) if HQPD−EĈD exceeds the maximum range
  Adjusting the ECD, then goto (2);

B. Prediction Method 2

The second method based on advance predicted bit plane coding is that the base layer encodes the DCT coefficient with respect to scalar quantized LQPD. All enhancement layers encode differences between the HQPD coefficients and the dequantized LQPD coefficients. Note that the difference of this method is the DCT coefficients encoded in low enhancement layers are derived from the HQPD coefficients, rather than the LQPD coefficients. This solution is low cost one in computational complexity because the expensive predict operations can be avoided during modifying references. At the same time, some error will be resulted in low enhancement layers. In low enhancement layers, the difference between the HQPD coefficients and the dequantized LQPD coefficients replaces the difference between the LQPD coefficients and the dequantized LQPD coefficients to be encoded and transmitted. This replacement will introduce a small error.

Although, some minor error will appear in low enhancement layer, it is fortunate that there is no error in the base layer. As a result, the minor error in low enhancement layers will only propagate within one or two frames due to the excellent properties in error recovery of PFGS. For instance, some error in the enhancement layer 104 of frame 2 in FIG. 4 will only affect all enhancement layers of frame 3 and enhancement layer 106 and 108 of frame 4. This solution is very viable for real-time applications because the low cost in computational complexity.

Exemplary Encoders With Advance Predicted Bit-Plane Coding

Figure 19:
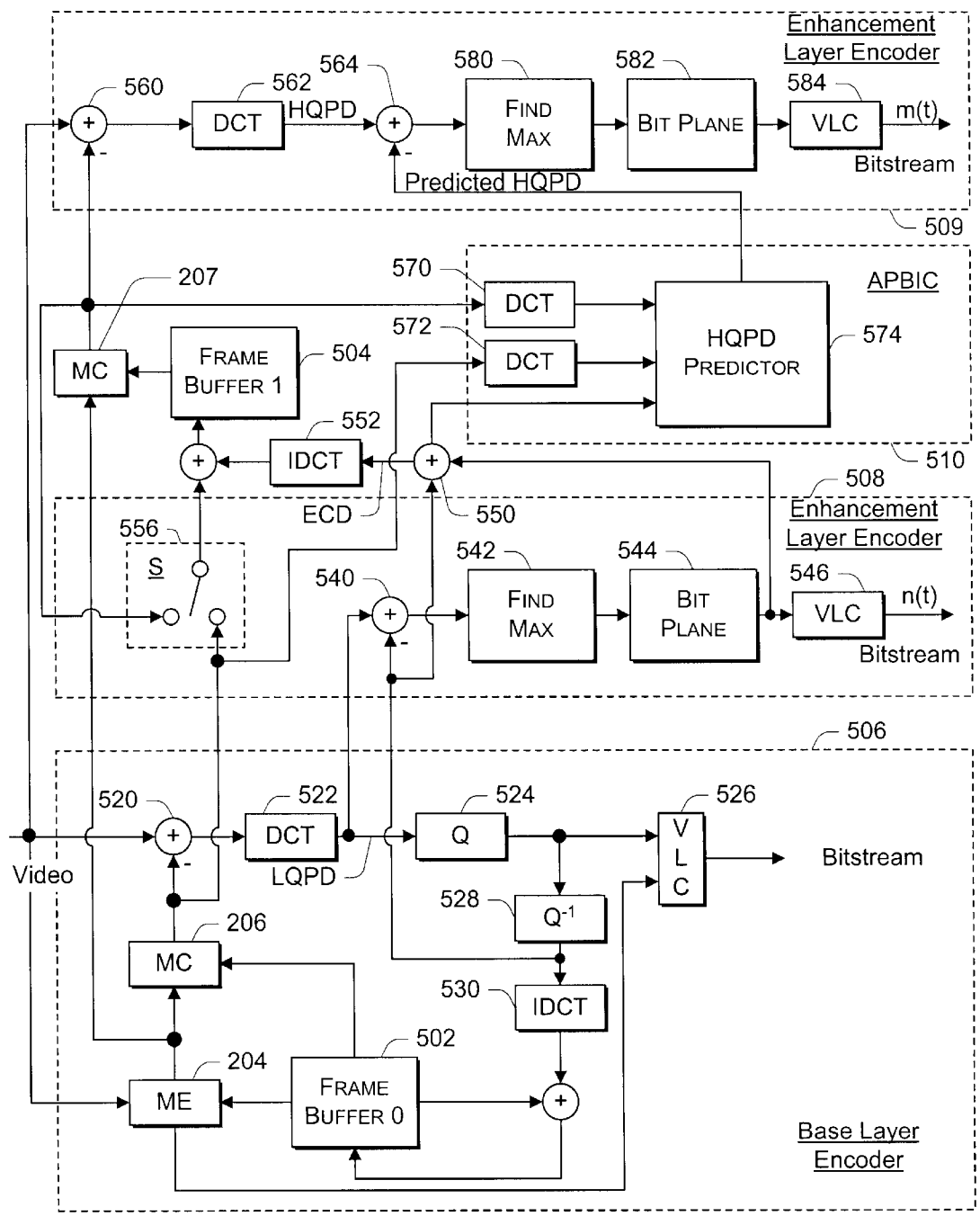
FIG. 19 is a block diagram of another exemplary video encoder implemented at the content producer/provider.

FIG. 19 shows one exemplary implementation of a video encoder, which may be implemented by server 74 to encode the video data files prior to distribution over the network 64 as illustrated by encoder 80 in FIG. 3. In FIG. 19, the video encoder is generally referenced as number 80' to differentiate it from the encoder 80 of FIG. 9. Like encoder 80 of FIG. 9, the video encoder 80' is configured to code video data according to a PFGS layered coding scheme. However, unlike the encoder 80, the video encoder 80' predicts the HQPD coefficients and encodes high quality residues based on the HQPD coefficients to remove or reduce residue fluctuations, thereby improving coding efficiency.

Video encoder 80' is designed to use multiple reference layers for image prediction. In particularly, the illustrated architecture implements the PFGS layered coding scheme of FIG. 4, in which two reconstructed layers are used for reference. The video encoder 80' employs two frame buffers 502 and 504, which offers a good tradeoff between coding efficiency and the additional cost in memory and computational complexity. A first frame buffer 502 is used to save the reconstructed base layer as a reference for the base layer and low enhancement layers of a predicted frame. A second frame buffer 504 is used to save a reconstructed enhancement layer in a previous frame as a reference for higher quality enhancement layers.

Video encoder 80' has a base layer encoder 506 that encodes the base layers into an encoded bitstream and two enhancement layer encoders 508 and 509 that encodes one or more enhancement layers into the encoded bitstream. The video encoder also has an advance prediction bit-plane coder (APBIC) 510 that generates the first term of the predicted encoded value E$\hat{C}$D, given in equation (5). The predicted encoded value E$\hat{C}$D provides a good prediction of the HQPD coefficients.

The video encoder 80' receives a video data input stream and directs the incoming image frames to a motion estimator 204 to estimate movement of objects in the frame. The motion estimator 204 receives as reference for the current input, a previous reconstructed frame stored in frame buffer 502. The motion estimator 204 outputs its results to two motion compensator 206 and 207, which in turn produce predicted images. The first motion compensator 206 predicts images by referencing the reconstructed base layer in frame buffer 502. The second motion compensator 207 predicts images by referencing a reconstructed enhancement layer in frame buffer 504. Although two compensators are illustrated, they may be integrated as a single component. The motion estimator 204 and motion compensators 206, 207 are well-known components used in conventional MPEG encoding.

The differences between the low quality base layers of the predicted image and the original image are computed at summation 520. The differences are transformed using a linear discrete cosign transformation (DCT) 522 to produce the low quality predicted DCT (LQPD) residues resulting from the motion compensation, as described above by equation (1). The LQPD coefficients are quantized by quantizer (i.e., the "Q" module) 524 and compressed by the variable length coder (VLC) 526 into the bitstream of the base layer.

The quantized LQPD coefficients output by quantizer 524 are also dequantized by the dequantizer (i.e., the "$Q^{-1}$" module) 528. The dequantized LQPD coefficients are passed through an inverse DCT (IDCT) 530 to reconstruct the base layer. The reconstructed base layer is stored in frame buffer 502.

The enhancement layer encoder 508 receives the LQPD coefficients (e.g., coefficients in layer 400) and the dequantized LQPD coefficients (e.g., the coefficients in layer 402) from the base layer encoder 506. The differences between these coefficients are computed at summation 540 to form the DCT residues that can be encoded using bit-plane coding into the bitstream of the enhancement layers, as illustrated in FIG. 13. The "find max" module 542 computes the maximum value of all absolute values in the DCT residues to determine the number of bit planes needed to represent the residues. The DCT residues are then encoded into multiple bit planes by a bit plane coder 544 and then compressed by the variable length coder (VLC) 546 into the bitstream of the enhancement layer. Although multiple VLCs are illustrated, it is noted that a common VLC may be used for all compression being performed on the base layer and enhancement layer data.

A summation 550 sums the DCT residues contained in one or more bit planes, as output from the bit plane coder 544, and the dequantized LQPD coefficients from the base layer encoder 506. This is essentially the operation illustrated in FIG. 14, where the dequantized DCT coefficients of the base layer 402 are added to the first enhancement layer 404 to produce encoded DCT (ECD) coefficients 420. An inverse DCT 552 computes an inverse transform on the ECD coefficients to reconstruct an enhancement layer. The reconstructed enhancement layer is summed at summation 554 with either a predicted base layer from the motion compensator 206 or a predicted enhancement layer from the motion compensator 207, depending upon the position of switch 556.

The differences between the high quality enhancement layers of the predicted image and the original image are computed at summation 560. The differences are transformed using a DCT transformation 562 to produce the high quality predicted DCT (HQPD) residues resulting from the motion compensation, as described above by equation (3). The HQPD coefficients are input to a summation 564.

The advance prediction bit-plane coder 510 receives the base layer from motion compensator 206, the enhancement layer from the motion compensator 207 and the ECD coefficients from summation 550. DCT modules 570 and 572 transform the base layer and enhancement layers to produce DCT coefficients, which are then input along with the ECD coefficients to the prediction module 574.

The prediction module 574 computes the first term of the predicted value EĈD in equation (5), which includes the ECD coefficients and the DCT coefficients of two predicted images $DCT_l$ and $DCT_h$. The output of the prediction model 574 is the predicted HQPD coefficients.

The summation 564 computes differences between the HQPD coefficients and the first terms of the predicted value EĈD to produce a set of high quality DCT residues. This is essentially the operation illustrated in FIG. 17, with the exception that the encoded DCT layer contains predicted EĈD coefficients. The high quality DCT residues output by the summation 564 exhibit smaller residues and significantly less fluctuation.

A "find max" module 580 computes the maximum value of all absolute values in the high quality DCT residues to determine the number of bit planes needed to represent the residues. The high quality DCT residues are then encoded into multiple bit planes by a bit plane coder 582 and compressed by the variable length coder (VLC) 584 into the bit-stream of the enhancement layer.

Figure 20:
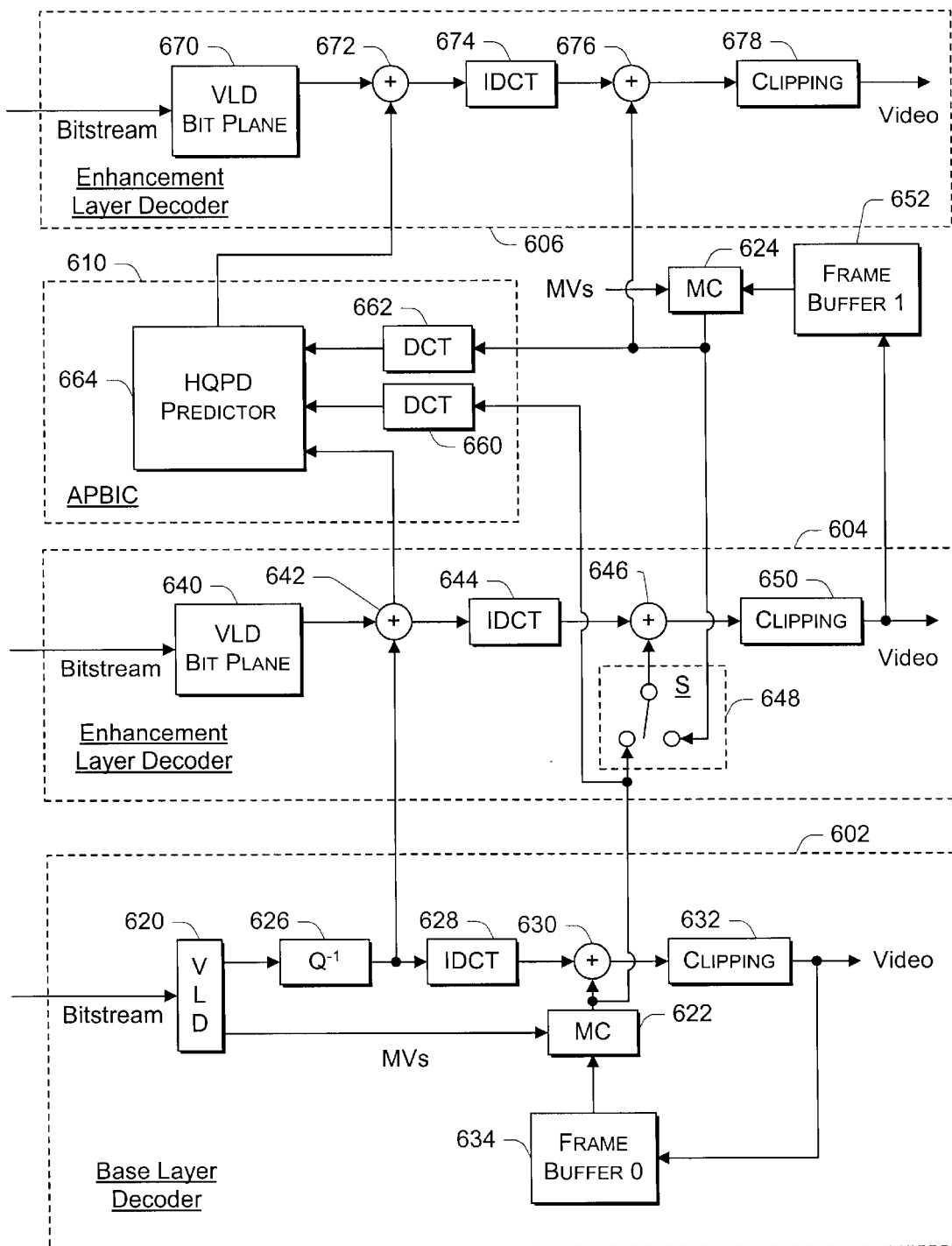
FIG. 20 is a block diagram of an exemplary video decoder implemented at the client, which is complementary to the video encoder of FIG. 19.

FIG. 20 shows the complementary video decoder 98', which may be implemented by client 66, to decode the video data files received over the network 64 (FIG. 3). The decoder 98' has a bit layer decoder 602 that decodes the bitstream for the base layers and two enhancement layer decoders 604 and 606 that decode the bitstream to recover the enhancement layers. The decoder 98' also has an advance prediction bit-plane coder (APBIC) 610, that is essentially identical to the encoder-side APBIC 510 in FIG. 19.

A variable length decoder (VLD) module 620 decodes the bit stream for the base layer to recover the quantized LQPD coefficients. Motion vectors (MVs) from the decoding are passed to motion compensators 622 and 624. These coefficients are dequantized by a dequantizer (i.e., the "$Q^{-1}$" module) 626 and then passed through an inverse DCT (IDCT) transform 628 to reconstruct the base layer. The reconstructed base layer is summed via summation 630 with a predicted base layer from the motion compensator 622, clipped by clipping module 632, and output. The reconstructed base layer is also stored in frame buffer 634.

A combined VLD and bit plane decoder module 640 decodes the bit stream carrying the lower quality DCT residues. The recovered DCT coefficients are summed via summation 642 with the dequantized LQPD coefficients from the base layer decoder 602 to reproduce the encoded DCT (ECD) coefficients. The ECD coefficients are passed to an IDCT transformer 644 to reconstruct the enhancement layer. The reconstructed enhancement layer is summed via summation 646 with either a predicted base layer from the motion compensator 622 or a predicted enhancement layer from the motion compensator 624, depending upon the position of switch 648. The compensated enhancement layer is clipped by clipping module 650 and output. The reconstructed enhancement layer is also stored in frame buffer 652.

The prediction bit-plane coder 610 receives the base layer from motion compensator 622, the enhancement layer from the motion compensator 624 and the ECD coefficients from summation 642. DCT modules 660 and 662 transform the base layer and enhancement layers to produce DCT coefficients, which are then input along with the ECD coefficients to the prediction module 664. The prediction module 664 computes the first term of the predicted value EĈD in equation (5), which includes the ECD coefficients and the DCT coefficients of two predicted images $DCT_l$ and $DCT_h$.

A combined VLD and bit plane decoder module 670 decodes the bit stream carrying the higher quality DCT residues. The summation 672 sums the high quality DCT residues and the first terms of the predicted value EĈD to produce the HQPD coefficients. An inverse DCT transformer 674 reconstructs the enhancement layer from the HQPD coefficients. The reconstructed enhancement layer is compensated by the output of the motion compensator 624 at summation 676, and then clipped by clipping module 678.

Figure 21:
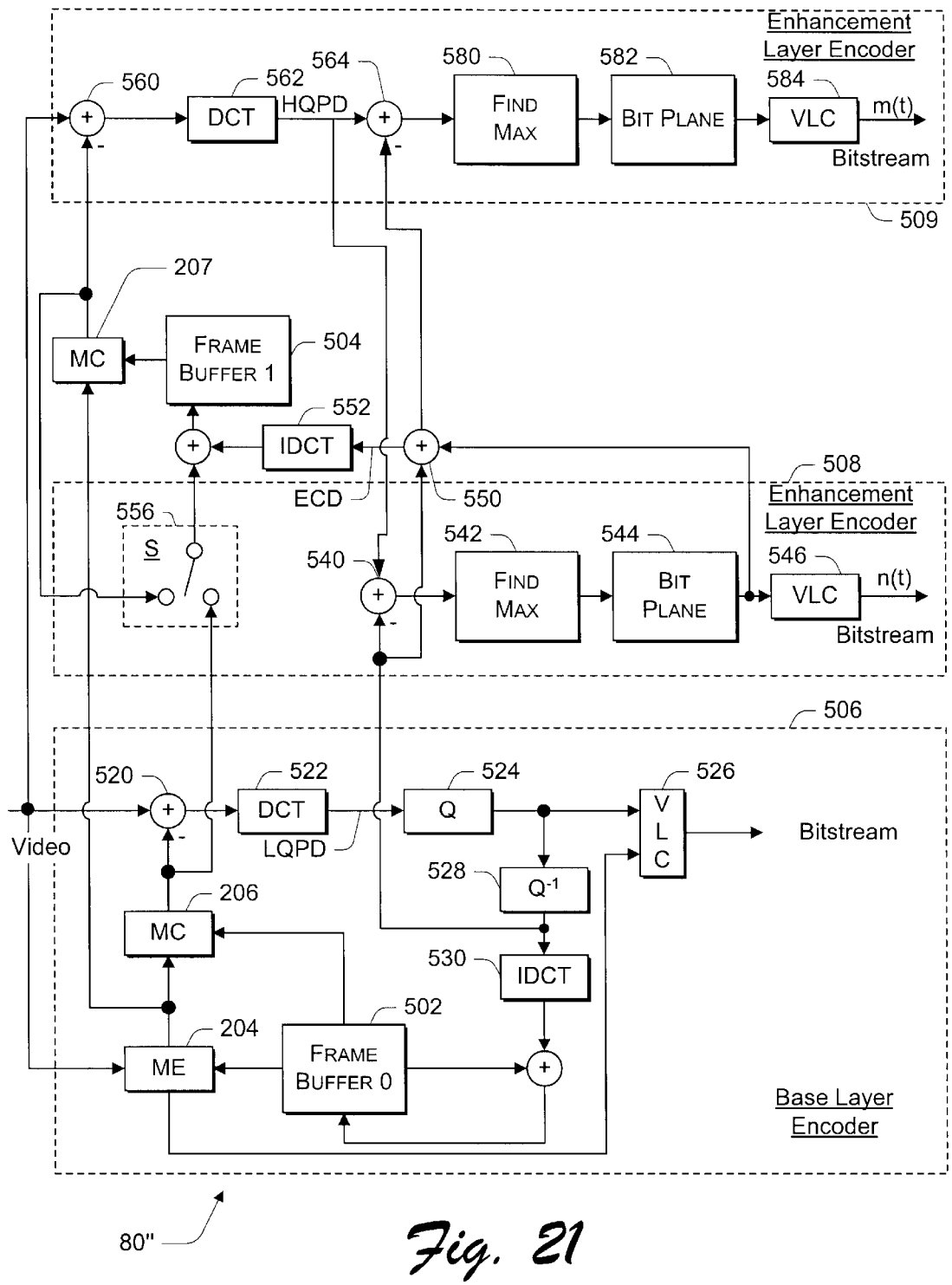
FIG. 21 is a block diagram of yet another exemplary video encoder implemented at the content producer/provider.

FIG. 21 shows another exemplary video encoder 80" that is based on the advance predicted bit-plane coding scheme, but is a simplified version of the encoder 80' of FIG. 19. Namely, unlike encoder 80', the video encoder 80" of FIG. 21 is modified so that the DCT residues encoded in the enhancement layer equal the differences between the HQPD coefficients and the reconstructed DCT coefficients of the base layer. All enhancement layers encode the residues between the HQPD coefficients and the dequantized coefficients in base layer. As a result, no prediction is used. This encoder 80" is therefore a low cost solution in terms of computational complexity because the expensive prediction operations are removed.

However, some error is resulted in the enhancement layers. In low enhancement layers, the difference between the HQPD coefficients and the ECD coefficients, rather than between the LQPD and ECD coefficients, will introduce some error during encoding. Fortunately, the error is contained because there is no error in the base layer. The error in the enhancement layers will only propagate within one or two frames because the excellent properties in error recovery of PFGS. The second solution is very available for real-time applications because the low cost in computational complexity.

Figure 22:
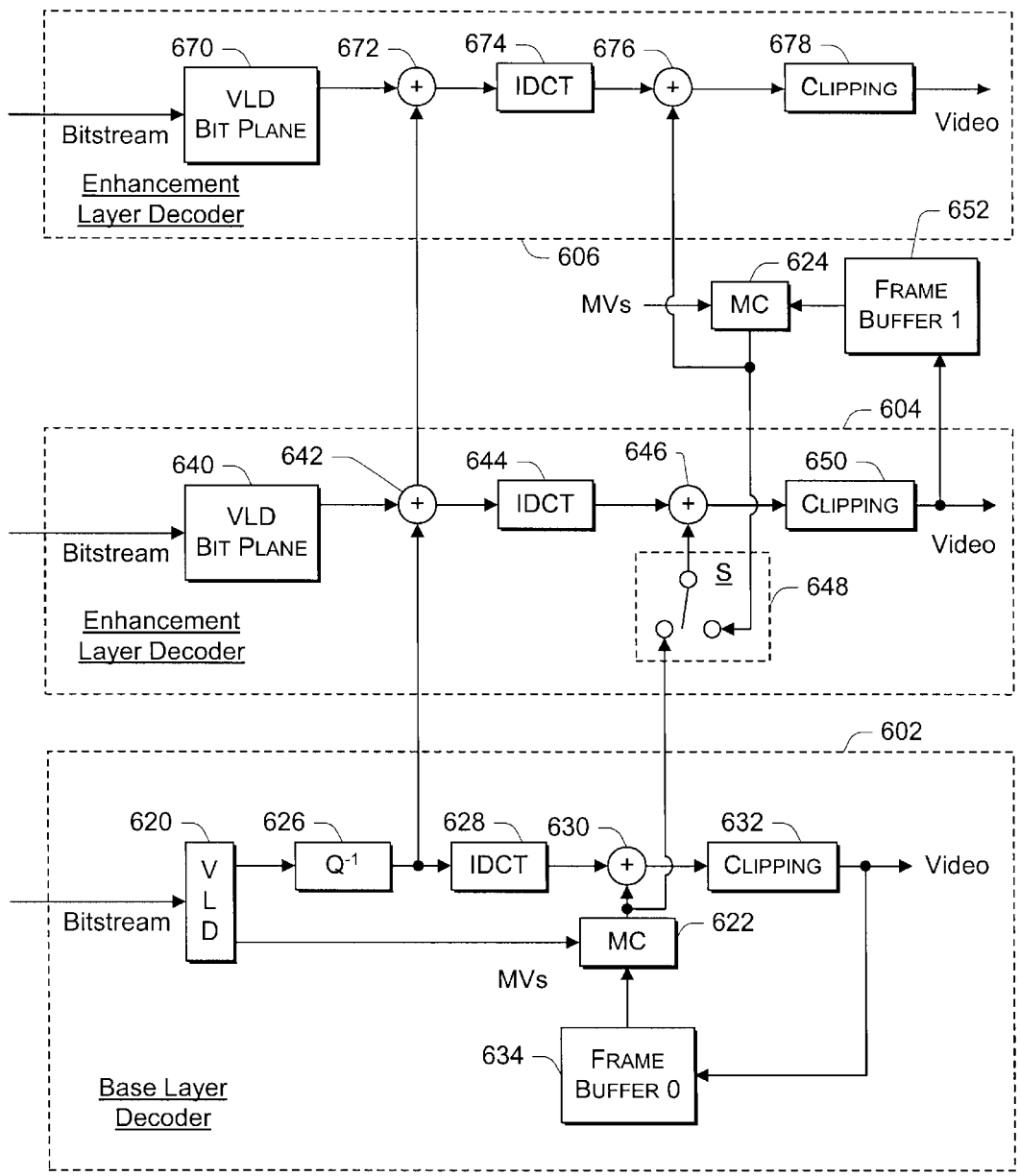
FIG. 22 is a block diagram of another exemplary video decoder implemented at the client, which is complementary to the video encoder of FIG. 21.

FIG. 22 shows the complementary video decoder 98" that corresponds to the video encoder 80" of FIG. 21.

Exemplary Coding Operation

Figure 23:
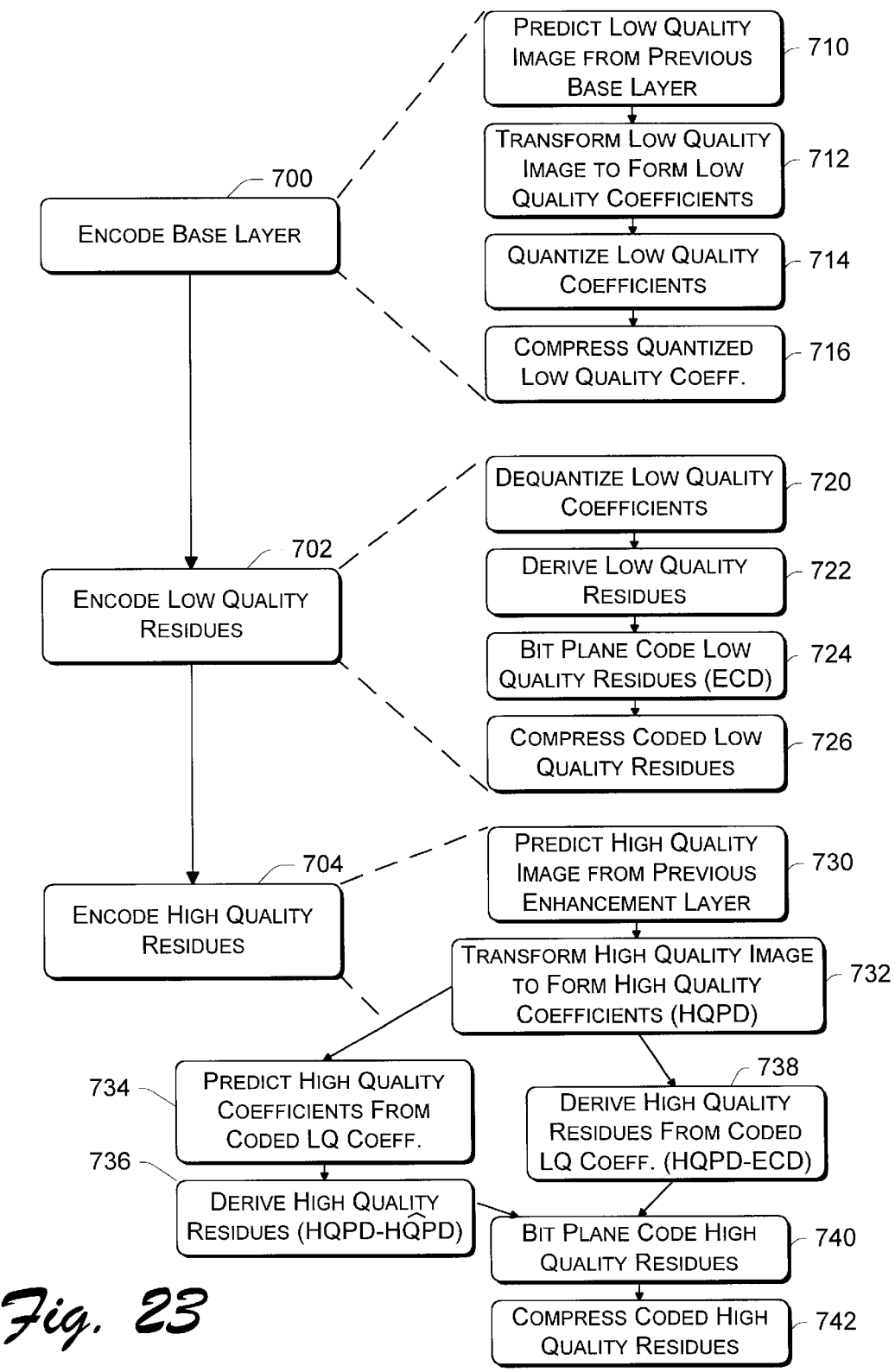
FIG. 23 is a flow diagram of a video coding process implemented by the video encoders of FIGS. 19 and 21.

FIG. 23 shows an exemplary video coding process implemented by the video encoders 80' and 80" of FIGS. 19 and 21, respectively. The video coding process may be implemented in hardware, software, or a combination of hardware and software. The process is described with additional reference to the encoders of FIGS. 19 and 21.

The process can be generally described as the combined operations of the base layer encoder 506, the low quality enhancement layer encoder 508, and the high quality enhancement layer encoder 509. At step 700, the base layer encoder 506 encodes a bitstream representing a base layer. At step 702, the low quality enhancement layer encoder 508 encodes a bitstream representing a low quality enhancement layer. This is done by encoding low quality residues that result from the low quality prediction of motion compensated images. At step 704, the high quality enhancement layer encoder 509 encodes a bitstream representing a high quality enhancement layer based in part on values predicted from the base layer and the low quality enhancement layer. This can be accomplished by encoding predicted high quality residues that are predicted in part from the low quality residues. The bitstreams can be stored on disk and/or transmitted over the network to the client.

Steps 710–716 show one sub-process for implementing the base layer encoding step 700. At step 710, the base layer encoder 506 predicts a low quality predicted image from a low quality reconstructed layer stored in the frame buffer 502. This predicted image varies slightly from the original image due to motion of the objects in the images as determined by the motion estimator 204 and the motion compensator 206.

At step 712, the base layer encoder 506 transforms the low quality predicted image using a transformation, such as the linear Discrete Cosine Transform 522, to produce low quality predicted DCT (LQPD) coefficients. The LQPD coefficients are quantized by quantizer 524 (step 714) and compressed by the variable length coder 526 (step 716).

Steps 720–726 illustrate one sub-process for implementing the low quality enhancement layer encoding step 702. At step 720, the base layer encoder 506 dequantizes the quantized LQPD coefficients. The low quality enhancement layer encoder 508 derives low quality residues resulting from prediction of the low quality image (step 722). The low quality residues are computed as the difference between the LQPD coefficients and the dequantized LQPD coefficients.

At step 724, the low quality residues are encoded via bit plane coder 544 to form the encoded DCT (ECD) coefficients. At step 726, the low quality enhancement layer encoder 508 compresses the ECD coefficients using variable length coder 546.

Steps 730–742 illustrate one sub-process for implementing the high quality enhancement layer encoding step 704. At step 730, the high quality enhancement layer encoder 509 predicts a high quality predicted image from a high quality reconstructed layer stored in the second frame buffer 504. This predicted image varies slightly from the original image due to motion of the objects in the images as determined by the motion estimator 204 and the motion compensator 207. At step 732, the high quality enhancement layer encoder 509 transforms the high quality predicted image using a transformation, such as the linear Discrete Cosine Transform 562, to produce high quality predicted DCT (HQPD) coefficients.

At this point, the process is slightly different depending upon whether encoder 80' of FIG. 19 is used or encoder 80" of FIG. 21. If encoder 80' is used, the APBIC 510 predicts a set of predicted HQPD coefficients from the ECD coefficients (step 734). The high quality enhancement layer encoder 509 then derives high quality residues as a difference between HQPD coefficients and the predicted HQPD coefficients (step 736).

Conversely, if encoder 80" is used, the APBIC 510 is removed. Accordingly, the high quality enhancement layer encoder 509 derives high quality residues as a difference between the HQPD coefficients and the ECD coefficients (step 738).

At step 740, the high quality enhancement layer encoder 509 encodes the high quality residues via bit plane coder 582. The coded high quality residues are then compressed using variable length coder 584 (step 742).

The client receives the bitstreams from the content provider. The video decoder at the client decodes the bitstreams to recover the base layer, low quality residues, and high quality residues. From this data, the decoder can recapture the original video image.

Conclusion

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method for coding video data according to layered coding techniques in which the video data is represented as multi-layered frames, each frame having multiple layers ranging from a base layer of low quality to enhancement layers of increasingly higher quality, the method comprising:

encoding a first bitstream representing a base layer;

encoding a second bitstream representing one or more low quality enhancement layers, the encoding comprising:
    motion compensating an original image using the base layer as a reference to form a low quality predicted image,
    transforming the low quality predicted image to form low quality predicted coefficients,
    quantizing the low quality predicted coefficients to form quantized coefficients,
    dequantizing the quantized coefficients to form dequantized coefficients,
    deriving low quality residues as a difference between the low quality predicted coefficients and the dequantized coefficients,
    bit plane coding the low quality residues to form coded low quality residues, and
    compressing the coded low quality residues using variable length coding; and encoding a third bitstream representing one or more high quality enhancement layers based in part on values predicted from the base layer and the low quality enhancement layer.

2. A method as recited in claim 1, wherein the encoding a first bitstream representing a base layer comprises:

motion compensating an original image using the base layer as a reference to form a low quality predicted image;

transforming the low quality predicted image to form low quality predicted coefficients;

quantizing the low quality predicted coefficients to form quantized coefficients; and compressing the quantized coefficients using variable length coding.

3. A method as recited in claim 1, wherein the encoding a third bitstream representing one or more high quality enhancement layers comprises:

motion compensating an original image using an enhancement layer as a reference to form a high quality predicted image;

transforming the high quality predicted image to form a first set of high quality coefficients;

predicting a second set of high quality coefficients from the coded low quality residues;

deriving high quality residues as a difference between the first and second sets of high quality coefficients;

bit plane coding the high quality residues; and compressing the coded high quality residues using variable length coding.

4. A method as recited in claim 1, further comprising:

decoding the first bitstream representing the base layer;

decoding the second bitstream representing one or more low quality enhancement layers; and decoding the third bitstream representing one or more the high quality enhancement layers based in part on values predicted from the base layer and the low quality enhancement layer.

5. A computer-readable medium having computer-executable instructions, which when executed on a processor, direct a computer to perform the steps of claim 1.

6. A method for coding video data according to layered coding techniques in which the video data is represented as multi-layered frames, each frame having multiple layers ranging from a base layer of low quality to enhancement layers of increasingly higher quality, the method comprising:

encoding a first bitstream representing a base layer;

encoding a second bitstream representing one or more low quality enhancement layers; and encoding a third bitstream representing one or more high quality enhancement layers based in part on values predicted from the base layer and the low quality enhancement layer;

wherein the encoding a second bitstream representing one or more low quality enhancement layers and the encoding a third bitstream representing one or more high quality enhancement layers comprises:

motion compensating an original image using the base layer as a reference to form a low quality predicted image and using an enhancement layer as a reference to form a high quality predicted image, transforming the low quality predicted image to form low quality predicted coefficients and transforming the high quality predicted image to form high quality predicted coefficients, quantizing the low quality predicted coefficients to form quantized coefficients, dequantizing the quantized coefficients to form dequantized coefficients, deriving low quality residues as a difference between the high quality predicted coefficients and the dequantized coefficients, bit plane coding the low quality residues to form coded low quality residues, deriving high quality residues as a difference between the high quality predicted coefficients and the coded low quality residues, bit plane coding the high quality residues to form coded high quality residues, and compressing the coded low quality residues and the coded high quality residues using variable length coding.

7. A method as recited in claim 6, wherein the encoding high quality residues comprises:

predicting one or more high quality enhancement layers of the current frame from a high quality enhancement layer of the previous frame;

transforming the high quality enhancement layer to form a first set of high quality coefficients;

predicting a second set of high quality coefficients from the low quality residues; and forming the high quality residues from the first and second sets of high quality coefficients.

8. A method as recited in claim 6, wherein the encoding high quality residues comprises:

predicting a high quality enhancement layer of the current frame from a high quality enhancement layer of the previous frame;

transforming the high quality enhancement layer to form high quality coefficients; and forming the high quality residues from the high quality coefficients and the low quality residues.

9. A computer-readable medium having computer-executable instructions, which when executed on a processor, direct a computer to perform the steps of claim 6.

10. A method for coding video data according to layered coding techniques in which the video data is represented as multi-layered frames, each frame having multiple layers ranging from low quality to increasingly higher quality, the method comprising:

predicting layers in a current frame using multiple layers of varying quality in a previous frame;

deriving low quality predicted residues from a low quality layer in the current frame and a low quality layer in the previous frame;

encoding the low quality predicted residues; and predicting, from the encoded low quality residues, high quality predicted residues representative of differences between a high quality layer in the current frame and a high quality layer in the previous frame.

11. A method as recited in claim 10, wherein the predicting layers comprises predicting a higher quality layer in the current frame from a lower quality layer in the previous frame.

12. A method as recited in claim 10, wherein the encoding comprises quantizing the low quality predicted residues to produce quantized residues and compressing the quantized residues using variable length coding.

13. A method as recited in claim 10, wherein the encoding comprises bit plane coding the low quality predicted residues.

14. A method as recited in claim 10, wherein the predicting high quality predicted residues comprises computing a predicted value based on the encoded low quality residues and two predicted images.

15. A method as recited in claim 10, wherein the predicting high quality predicted residues comprises computing a predicted value based on two predicted images and an estimation of one of the two predicted images.

16. A computer-readable medium having computer-executable instructions, which when executed on a processor, direct a computer to perform the steps of claim 10.

17. A method for coding video data according to layered coding techniques in which the video data is represented as multi-layered frames, each frame having multiple layers ranging from a base layer of low quality to enhancement layers of increasingly higher quality, the method comprising:

forming a base layer and multiple enhancement layers in a first frame representing an original image; and predicting, from the base layer and at least one enhancement layer in the first frame, a base layer and multiple enhancement layers in a second frame representing a predicted image; and deriving low quality residues resulting from the predicting of the base layer and low quality enhancement layers from the original image;

encoding the low quality residues; and predicting, from the encoded low quality residues, high quality residues indicative of results from predicting high quality enhancement layers from the original image, wherein the multiple enhancement layers include at least first, second, and third layers, and the forming of the multiple enhancement layers comprises predicting even frames from the base and second layers of preceding frames and predicting odd frames from the base and third layers of preceding frames.

18. A method as recited in claim 17, further comprising encoding the high quality residues.

19. A method as recited in claim 18, further comprising transmitting the encoded low quality residues and the high quality residues.

20. A computer-readable medium having computer-executable instructions, which when executed on a processor, direct a computer to perform the steps of claim 17.

21. A method for coding video data according to layered coding techniques in which the video data is represented as multi-layered frames, each frame having multiple layers ranging from a base layer of low quality to enhancement layers of increasingly higher quality, the method comprising:

forming a base layer and multiple enhancement layers in a first frame representing an original image; and predicting, from the base layer and at least one enhancement layer in the first frame, a base layer and multiple enhancement layers in a second frame representing a predicted image; and deriving low quality residues resulting from the predicting of the base layer and low quality enhancement layers from the original image;

encoding the low quality residues; and predicting, from the encoded low quality residues, high quality residues indicative of results from predicting high quality enhancement layers from the original image, wherein the forming of the multiple enhancement layers comprises predicting each of the enhancement layers in a current frame from a lower quality reference layer of a reference frame if a relationship holds true, the relationship being:

L mod N=i mod M where L is a variable designating a particular enhancement layer, i is a variable designating a particular frame, N is a variable representing a layer group depth of how many layers are predicted from a common reference layer, and M is a variable representing a frame group depth of how many frames are grouped together for prediction purposes.

22. A computer-readable medium having computer-executable instructions, which when executed on a processor, direct a computer to:

(A) encode a first bitstream representing a base layer by:
motion compensating an original image using a base layer as a reference to form a low quality predicted image;
transforming the low quality predicted image to form low quality predicted coefficients; and
quantizing the low quality predicted coefficients to form quantized coefficients;

(B) encode a second bitstream representing a low quality enhancement layer by:
dequantizing the quantized coefficients to form dequantized coefficients;
deriving low quality residues as a difference between the low quality predicted coefficients and the dequantized coefficients; and
bit plane coding the low quality residues to form coded low quality residues;

(C) encode a third bitstream representing a high quality enhancement layer by:
motion compensating an original image using an enhancement layer as a reference to form a high quality predicted image;
transforming the high quality predicted image to form a first set of high quality coefficients;
predicting a second set of high quality coefficients from the coded low quality residues;
deriving high quality residues as a difference between the first and second sets of high quality coefficients; and
bit plane coding the high quality residues.

23. A computer-readable medium as recited in claim 22, further comprising computer-executable instructions, which when executed on a processor, direct a computer to compress the quantized coefficients, the coded low quality residues, and the coded high quality residues using variable length coding.

24. A computer-readable medium having computer-executable instructions, which when executed on a processor, direct a computer to:

(A) encode a first bitstream representing a base layer by:
motion compensating an original image using a base layer as a reference to form a low quality predicted image;
transforming the low quality predicted image to form low quality predicted coefficients; and
quantizing the low quality predicted coefficients to form quantized coefficients;

(B) encode second and third bitstreams representing a low quality enhancement layer and a high quality enhancement layer by:
dequantizing the quantized coefficients to form dequantized coefficients;
motion compensating the original image using an enhancement layer as a reference to form a high quality predicted image;
transforming the high quality predicted image to form high quality predicted coefficients;
deriving low quality residues from the high quality predicted coefficients and the dequantized coefficients;
bit plane coding the low quality residues to form coded low quality residues;
deriving high quality residues from the high quality predicted coefficients and the coded low quality residues; and
bit plane coding the high quality residues to form coded high quality residues.

25. A computer-readable medium as recited in claim 24, further comprising computer-executable instructions, which when executed on a processor, direct a computer to compress the quantized coefficients, the coded low quality residues, and the coded high quality residues using variable length coding.

26. A video coding system, comprising:

means for predicting layers in a current frame using multiple layers of varying quality in a previous frame;

means for deriving low quality predicted residues from a low quality layer in the current frame and a low quality layer in the previous frame;

means for encoding the low quality predicted residues; and means for predicting, from the encoded low quality residues, high quality predicted residues representative of differences between a high quality layer in the current frame and a high quality layer in the previous frame.

27. An operating system comprising the video coding system of claim 26.

28. A video coding system, comprising:
   means for forming a base layer and multiple enhancement layers in a first frame representing an original image; and
   means for predicting, from the base layer and at least one enhancement layer in the first frame, a base layer and multiple enhancement layers in a second frame representing a predicted image; and
   means for deriving low quality residues resulting from the predicting of the base layer and low quality enhancement layers from the original image;
   means for encoding the low quality residues; and
   means for predicting, from the encoded low quality residues, high quality residues indicative of results from predicting high quality enhancement layers from the original image.

29. Operating system comprising the video coding system of claim 28.

* * * * *

UNITED STATES PATENT AND TRADEMARK OFFICE
CERTIFICATE OF CORRECTION

PATENT NO. : 6,700,933 B1
DATED : March 2, 2004
INVENTOR(S) : Wu et al.

It is certified that error appears in the above-identified patent and that said Letters Patent is hereby corrected as shown below:

Title page,
Item [56], References Cited, OTHER PUBLICATIONS, add the following:

-- Wu et al., "DCT Prediction Based Progressive Fine Granularity Scalable Coding", September 10-13, 2000, pp. 556-559.
Nakamura et al., "scalable Coding Schemes based on DCT and MC Prediction", October 23, 1995, pp. 575-578 --.

Column 3,
Line 25, replace "an other" with -- another --.

Column 10,
Line 32, replace "quantification" with -- quantization --.
Lines 34 and 63, replace "quantified" with -- quantized --.

Column 30,
Line 10, insert -- An -- between "29." and "Operating".
Line 10, replace "Operating" with -- operating --.

Signed and Sealed this

Twelfth Day of October, 2004

JON W. DUDAS
*Director of the United States Patent and Trademark Office*